(12) United States Patent
Holmberg-Nielsen et al.

(10) Patent No.: US 12,307,197 B2
(45) Date of Patent: *May 20, 2025

(54) SYSTEMS AND METHODS FOR GENERATING SOCIAL ASSETS FROM ELECTRONIC PUBLICATIONS

(71) Applicant: ISSUU, INC., Palo Alto, CA (US)

(72) Inventors: Alette Holmberg-Nielsen, Palo Alto, CA (US); John Sturino, Palo Alto, CA (US); Joe Hyrkin, Palo Alto, CA (US); Slavko Krucaj, Palo Alto, CA (US); Slawomir Smiechura, Palo Alto, CA (US); Erik Juhl, Palo Alto, CA (US); Erika Fogarty, Palo Alto, CA (US)

(73) Assignee: ISSUU, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/607,340

(22) Filed: Mar. 15, 2024

(65) Prior Publication Data

US 2024/0303428 A1    Sep. 12, 2024

Related U.S. Application Data

(63) Continuation of application No. 17/586,426, filed on Jan. 27, 2022, now Pat. No. 11,934,774, which is a
(Continued)

(51) Int. Cl.
*G06F 16/34* (2025.01)
*G06F 40/103* (2020.01)
(Continued)

(52) U.S. Cl.
CPC .......... *G06F 40/186* (2020.01); *G06F 16/345* (2019.01); *G06F 40/103* (2020.01);
(Continued)

(58) Field of Classification Search
CPC .... G06F 16/345; G06F 40/186; G06F 40/114; G06F 40/109; G06F 40/137; G06F 40/151; G06F 40/131; G06F 40/103
See application file for complete search history.

(56) References Cited

U.S. PATENT DOCUMENTS 5,892,843 A    4/1999    Zhou et al.
6,169,998 B1   1/2001    Iwasaki et al.
(Continued)

FOREIGN PATENT DOCUMENTS

DE    102012216165 A1    3/2013
WO       2010078475 A2    7/2010

OTHER PUBLICATIONS

U.S. Appl. No. 16/572,525—Office Action dated Jan. 25, 2021, 14 pages.
(Continued)

*Primary Examiner* — Sanchita Roy
(74) *Attorney, Agent, or Firm* — HAYNES BEFFEL & WOLFELD LLP; Ernest J. Beffel, Jr.; Paul A. Durdik

(57) ABSTRACT

Systems and techniques are provided for generating a social asset from an electronic publication. The system includes providing a template having a set of reserve spaces for elements. The system receives an electronic publication containing elements including images and text passages. The system assigns images from the publication to each of the reserve spaces for images including assigning a first image from the publication to a first reserve space of the reserve spaces for an image. The system chooses a first text passage of the text passages for associating with the first image. The system selects a portion of less than all of the first text passage. The system generates a social asset by processing the set of reserve spaces to automatically move forward in an animated manner wherein the selected portion
(Continued)

of the first text passage superimposes a portion of the first image.

21 Claims, 25 Drawing Sheets

Related U.S. Application Data continuation of application No. 16/572,525, filed on Sep. 16, 2019, now Pat. No. 11,238,215.

(60) Provisional application No. 62/775,300, filed on Dec. 4, 2018.

(51) Int. Cl.
```
G06F 40/114      (2020.01)
G06F 40/186      (2020.01)
G06T 11/60       (2006.01)
G06V 30/413      (2022.01)
G06V 30/416      (2022.01)
G06V 30/414      (2022.01)
```

(52) U.S. Cl.
CPC ............ *G06F 40/114* (2020.01); *G06T 11/60* (2013.01); *G06V 30/413* (2022.01); *G06V 30/416* (2022.01); *G06V 30/414* (2022.01)

(56) References Cited

U.S. PATENT DOCUMENTS

| | | | |
|---|---|---|---|
| 6,219,679 B1 | 4/2001 | Brisebois et al. |
| 6,976,210 B1 | 12/2005 | Silva et al. |
| 7,130,861 B2 | 10/2006 | Bookman et al. |
| 7,519,573 B2 | 4/2009 | Helfman et al. |
| 7,912,705 B2 | 3/2011 | Wasson et al. |
| 7,962,846 B2 | 6/2011 | Lerner et al. |
| 8,255,820 B2 | 8/2012 | Rivlin et al. |
| 8,332,424 B2 | 12/2012 | Flynn et al. |
| 8,558,808 B2 | 10/2013 | Forstall et al. |
| 8,582,801 B2 | 11/2013 | Goto et al. |
| 8,799,273 B1 | 8/2014 | Chang et al. |
| 2005/0021754 A1 | 1/2005 | Alda et al. |
| 2005/0055632 A1 | 3/2005 | Schwartz et al. |
| 2007/0044013 A1 | 2/2007 | Hyatt |
| 2007/0217701 A1 | 9/2007 | Liu et al. |
| 2008/0077847 A1 | 3/2008 | Dejean |
| 2008/0162356 A1 | 7/2008 | Parket et al. |
| 2008/0201452 A1 | 8/2008 | Athas et al. |
| 2008/0294981 A1 | 11/2008 | Balzano et al. |
| 2008/0307297 A1 | 12/2008 | Ohlenbusch et al. |
| 2009/0172517 A1 | 7/2009 | Kalicharan |
| 2009/0187535 A1 | 7/2009 | Warnock et al. |
| 2010/0005387 A1 | 1/2010 | Toki |
| 2011/0099071 A1 | 4/2011 | Johnson |
| 2011/0117971 A1 | 5/2011 | Kim et al. |
| 2011/0125512 A1 | 5/2011 | Huang |
| 2011/0184960 A1 | 7/2011 | Delpha et al. |
| 2012/0005567 A1 | 1/2012 | Burckart et al. |
| 2012/0030553 A1 | 2/2012 | Delpha et al. |
| 2012/0137200 A1 | 5/2012 | Shar et al. |
| 2012/0144292 A1 | 6/2012 | Lee |
| 2012/0151383 A1 | 6/2012 | Kazan et al. |
| 2012/0311509 A1 | 12/2012 | Maggiotto et al. |
| 2013/0014007 A1 | 1/2013 | Kopp et al. |
| 2013/0042200 A1 | 2/2013 | Armitage |
| 2013/0054613 A1 | 2/2013 | Bishop |
| 2013/0247221 A1 | 9/2013 | Mctor |
| 2013/0259377 A1 | 10/2013 | Goktekin |
| 2014/0006982 A1 | 1/2014 | Wabyick et al. |
| 2014/0250371 A1 | 9/2014 | Wabyick et al. |
| 2014/0250372 A1 | 9/2014 | Slembrouck |
| 2014/0282069 A1 | 9/2014 | Canetti et al. |
| 2015/0007104 A1 | 1/2015 | Zhu |
| 2015/0220490 A1 | 8/2015 | Barber |
| 2015/0254213 A1 | 9/2015 | McGushion et al. |
| 2016/0147713 A1 | 5/2016 | Ni et al. |
| 2016/0357717 A1 | 12/2016 | Metz et al. |
| 2017/0147544 A1 | 5/2017 | Modani et al. |
| 2018/0129634 A1 | 5/2018 | Sivaji et al. |
| 2018/0196804 A1 | 7/2018 | Mani et al. |
| 2018/0276296 A1 | 9/2018 | Gerlach |

OTHER PUBLICATIONS

Rodriguez et al., "The convergence of digital libraries and the peer-review process." Journal of Information Science 32.2 (2006), 12 pages.

Phelps et al., "Multivalent documents: Inducing structure and behaviors in online digital documents." In System Sciences, 1996., Proceedings of the Twenty-Ninth Hawaii International Conference on,, vol. 5, pp. 144-152. IEEE, 1996.

Jäschke et al., "Organizing Publications and Bookmarks in BibSonomy." In CKC. 2007, 4 pages.

Dudchuk et al., "Ontos clip and share," Proceedings of the 6th International Conference on Semantic Systems. ACM, 2010, 2 pages.

U.S. Appl. No. 14/657,831—Office Action dated Jan. 26, 2017, 60 pages.

U.S. Appl. No. 14/657,831—Final Office Action dated Jun. 30, 2017, 57 pages.

Google, definition of the word "specify", retrieved on Jan. 24, 2018, available at <https://www.google.com/search?q=define%3A+specifying&rlz=1C1GGRV_enUS768&oq=define%3A+specifying&aqs=chrome . . . 69i57j69i58.7733j0j7&sourcid=chrome&ie=UTF-8>, 1page.

U.S. Appl. No. 14/657,831—Final Office Action dated Feb. 8, 2018, 59 pages.

Walsh, "Facebook Open Graph META Tags," https://web.archive.org/web/20110429065857/https://davidwalsh.name/facebook-meta-tags, accesed May 4, 2018, 2 pages.

U.S. Appl. No. 15/415,693—Office Action dated Aug. 16, 2018, 18 pages.

PCT/US2017/040264—International Search Report and Written Opinion dated Mar. 29, 2018, 8 pages.

U.S. Appl. No. 15/415,693—Final Office Action dated Mar. 14, 2019, 16 pages.

U.S. Appl. No. 15/415,693—Reply to Final Office Action dated Mar. 14, 2019 filed Jun. 10, 2019, 16 pages.

PCT/US2017/040264—International Prelimianry Report on Patentabilty dated Jan. 9, 2020, 7 pages.

U.S. Appl. No. 15/415,693—Office Action dated Mar. 12, 2020, 20 pages.

Adobe.com, Adobe Acrobat 5.0, Reflow the contents of Adobe PDF, Mar. 2012, 2 pages (retreived from hhttps://web.archive.org/web/20120312080826/http://www.adobe.com/uk/epaper/tips/acr5reflow/pdfs/acr5reflow.pdf).

Adobe.com, Liquid layouts and Alternate layouts, CC, CS6, Mar. 16, 2017, 11pagtes (retreived from https://helpx.adobe.com/indesign/using/alternate-layouts-liquid-layouts.html).

U.S. Appl. No. 15/415,693—Response to Office Action dated Mar. 12, 2020, filed Jun. 18, 2020, 34 pages.

U.S. Appl. No. 15/415,693—Office Action dated May 14, 2021, 21 pages.

U.S. Appl. No. 15/415,693—Response to Final Office Action dated Aug. 11, 2020 filed Feb. 11, 2021, 20 pages.

U.S. Appl. No. 15/415,693—Final Office Action dated Aug. 11, 2020, 22 pages.

U.S. Appl. No. 15/415,693—Response to Office Action dated Aug. 16, 2018 filed Dec. 14, 2018, 21 pages.

U.S. Appl. No. 14/657,831—Notice of Allowance dated May 23, 2018, 28 pages.

U.S. Appl. No. 14/657,831—Response to Final Office Action dated Feb. 8, 2018 filed Apr. 12, 2018, 15 pages.

U.S. Appl. No. 14/657,831—Response to Final Office Action dated Jun. 30, 2017 filed Dec. 21, 2017, 21 pages.

(56) References Cited

OTHER PUBLICATIONS

U.S. Appl. No. 14/657,831—Response to Final Office Action dated Jun. 30, 2017 filed Oct. 25, 2017, 24 pages.
U.S. Appl. No. 14/657,831—Response to Office Action dated Jan. 26, 2017 filed May 19, 2017, 24 pages.
U.S. Appl. No. 16/572,525—Response to Office Action dated Jan. 25, 2021, filed Apr. 26, 2021, 15 pages.
U.S. Appl. No. 16/572,525—Notice of Allowance dated May 4, 2021, 28 pages.
U.S. Appl. No. 16/572,525—Notice of Allowance dated Sep. 14, 2021, 26 pages.
U.S. Appl. No. 15/415,693—Response to Office Action dated May 14, 2021 filed Nov. 15, 2021, 15 pages.
U.S. Appl. No. 15/415,693—Response to Office Action dated Mar. 12, 2020, filed Jun. 18, 2020, 10 pages.
U.S. Appl. No. 14/657,831—Response to Office Action dated Jan. 26, 2017 filed May 19, 2019, 24 pages.

SYSTEMS AND METHODS FOR GENERATING SOCIAL ASSETS FROM ELECTRONIC PUBLICATIONS

PRIORITY APPLICATION

This application is a continuation of U.S. patent application Ser. No. 17/586,426 entitled "Systems and Methods for Generating Social Assets from Electronic Publications", filed Jan. 27, 2022, which is a continuation of U.S. patent application Ser. No. 16/572,525 entitled "Systems and Methods for Generating Social Assets from Electronic Publications", filed Sep. 16, 2019, which claims the benefit of U.S. Provisional Patent Application No. 62/775,300, entitled "Story Formation", filed Dec. 4, 2018. The Non-Provisional and Provisional applications are incorporated herein by reference.

BACKGROUND

Field

The present invention relates to systems that generate social assets for publication on social media.

Description of Related Art

With the rise of electronic publishing, more and more readers are viewing published documents such as magazines, newspapers, catalogs, brochures, trade and scientific journal and the like on electronic devices. These documents are generally made available to electronic publishers as portable document format (PDF) files and are formatted for print rather than viewing on electronic devices. Navigation in an electronic document described in a PDF file can be cumbersome, particularly on an electronic device having a small screen such as a mobile phone or a small tablet. It has also become commonplace to "share" a wide variety of documents by means of social media platforms such as Snapchat™, Instagram™ etc. These social media platforms present information in the form of a social asset such as a visual story or a social story.

Therefore, an opportunity arises to automatically and seamlessly generate content from published documents which can be displayed on electronic devices or shared through social media platforms.

SUMMARY

A system, and method for operating a system, are provided to generate a social asset from an electronic publication. The system includes a template having a set of reserve spaces for elements. At least one reserve space is for an image. The system can include a publications database containing publications, and a computer server coupled to the publication database. The system receives an electronic publication containing elements including images and text passages. The system includes logic to assign images from the publication to each of the reserve spaces for images. This assignment can include assigning images from the publication to each of the reserve spaces for an image. The system includes logic to choose a first one of the text passages for associating with the first image. The system can generate a social asset by processing the set of reserve spaces to automatically move forward in an animated manner. The selected portion of the first text passage, and not portions of the first text passage other than the selected portion of the first text passage, superimposes a portion of the first image.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

Other aspects and advantages of the present invention can be seen on review of the drawings, the detailed description and the claims, which follow.

BRIEF DESCRIPTION OF THE DRAWINGS

The invention will be described with respect to specific embodiments thereof, and reference will be made to the drawings, in which:

FIGS. 5A, 5B, 5C, 5D, 5E-1, 5E-2, 5E-3, 5F-1, 5F-2, 5F-3, 5G-1, 5G-2, 5H-1, 5H-2, 5I, 5J-1, 5J-2, 5K-1 and 5K-2 present an example illustrating the process steps to create a social asset.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

System Overview

A system and various implementations of the subject technology are described with reference to FIGS. 1-6. The system and processes are described with reference to FIG. 1, an architectural level schematic of a system in accordance with an implementation. Because FIG. 1 is an architectural diagram, certain details are omitted to improve the clarity of the description.

Figure 1:
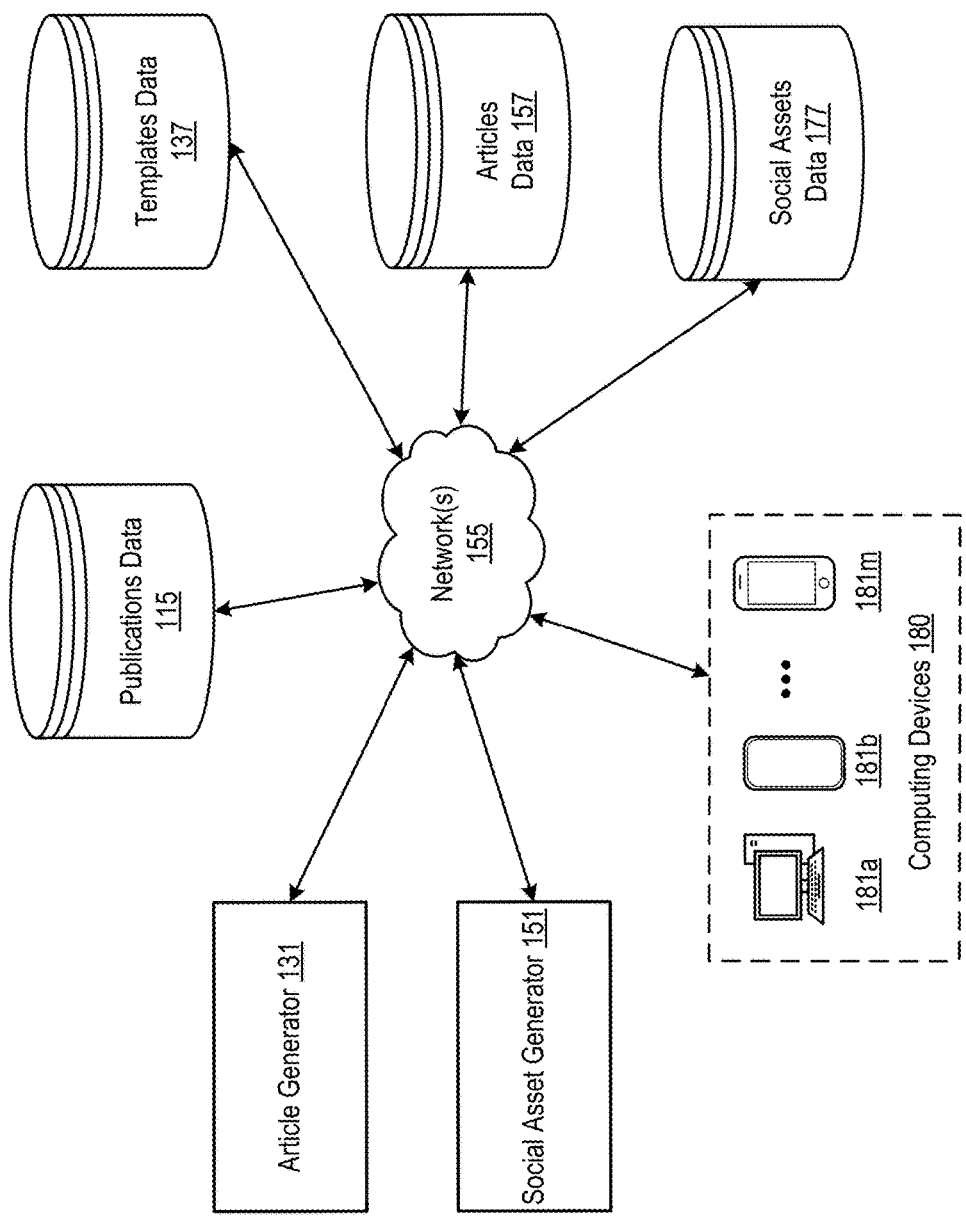
FIG. 1 illustrates an architectural level schematic of a system incorporating aspects of the invention.

The discussion of FIG. 1 is organized as follows. First, the elements of the system are described, followed by their interconnections. Then, the use of the elements in the system is described in greater detail.

FIG. 1 provides a block diagram level illustration of a system 100. The system 100 includes, a publications database 115, an article generator 131, a templates database 137, a social asset generator 151, an articles database 157, a social assets database 177, computing devices 180, and a network(s) 155. The article generator 131 and the social asset generator 151 constitute computer systems programmed with software code portions that, when execute by the computer system, cause it to perform the steps described herein. The article generator 131 and the social asset generator 151 may be implemented together on one computer system or on separate computer systems, and either or both of them may itself include parts implemented on more than one computer system. The computing devices 180 can include a plurality of desktop or laptop computers (181a) and mobile computing devices (181b to 181m). One or more computing devices 180 can be associated with a user.

The publications database 115 can include one or more publications published by one or more publishers. The publications can be in the form of electronic documents. The electronic documents can be stored in portable document format (PDF) files. The publication database can also include content in other formats such Microsoft Word™ (e.g., DOCX files) PowerPoint™ (e.g., PPT files) or videos (e.g., in MPEG files).

The article generator 131 can access the publications data via the network 155 and receive an electronic publication document stored in the publications database 115. The article generator 151 includes logic to extract or access elements of an electronic publication document 115. The elements of an electronic publication can include images, text passages, links such as uniform resource locators (URLs), table of content, index, layers, thumbnails or metadata about the electronic document. Some elements can include nested elements such as a text passage can have multiple sentences and each sentence in a text passage can include multiple words, white spaces and punctuation marks. The sentences can also include captions for images in the electronic document. As used herein, the term "text passage" means a sequence of characters. Typically the characters in the text passage includes one or more sentences, and a "sentence" includes one or more words, plus spaces and punctuation. The system can identify a sentence for example by looking for a sequence of words that starts with a capitalized first letter and ends with a period. The article generator includes logic to determine a reading order for one or more elements of an article in the electronic document. For example, the article generator can determine reading order for selected elements in the electronic publication document such as text passages, images, and videos representing the content of an article. The videos can be stored in the publications database and provided to the article generator along with the electronic publication.

The electronic publication can have more than one article. Various types of articles can be published in a magazine for example, an essay, a recipe, an interview, a personality profile, etc. In one embodiment, the article generator 131 determines the reading order for one article in the publication. The reading order identifies the ordering of the content in the article such as text passages, images, and videos, etc. The reading order of the article identifies the sequence in which the content of the article is to be presented to a reader on computing devices 180. The article generator 131 can generate an article from the electronic publication that can be published in a news website such as Google™ News, Apple™ News or published on a webpage. The article can be viewed or read on different types of computing devices 180 as presented in FIG. 1. The articles generated by the article generator 131 can be stored in the articles database 157.

The social asset generator 151 can a generate social asset such as a visual story based on an article the electronic publication. The social asset generator 151 includes the logic to access electronic documents from the publications database 115. It includes the reading order determination logic for contents of an article as presented above for article generator 131. The social asset generator 151 can access the templates database 137 to receive a template. A template has one or more pages that are designed for displaying content on the display of a mobile computing device such as a mobile phone or a tablet. A page of a template has one or more placeholders for different types of content e.g., text, image, video, etc. These placeholders are also referred to as reserve spaces, cells or slots. In one embodiment, the social asset generator 151 includes logic to select content from the article in the electronic publication and position the content in respective reserve spaces. For example, a first image from the article in the electronic document is placed in the first reserve space for image on the first page of the template. Similarly, text from text passages is positioned in the reserve space for text on the pages of the template. A video can be positioned in the reserve space for a video in the template.

The social asset generator 151 can fill in all of the reserve spaces in all pages of the template with appropriate content from the article in the electronic publication. In one embodiment, not all content from the article in the electronic publication is filled in the reserve spaces in the template. For example, fewer than total images can be selected for filling the reserve spaces for images in the template. Likewise, selected portions of text from the text passages can be selected to fill in the reserve spaces for text. The social asset generator 151 includes logic to generate social assets in more than one target formats. For example, one target format can be for sharing on social media platforms like Snapchat™, Instagram™, etc. Another target format can be used to view social asset on mobile and desktop computing devices 180. In addition to sharing the social assets via social media platforms, the social asset generate 151 can store the social assets in the social assets database 177. A social asset is also referred to as a visual story or a social story in this text.

Process Flow

Figure 2A:
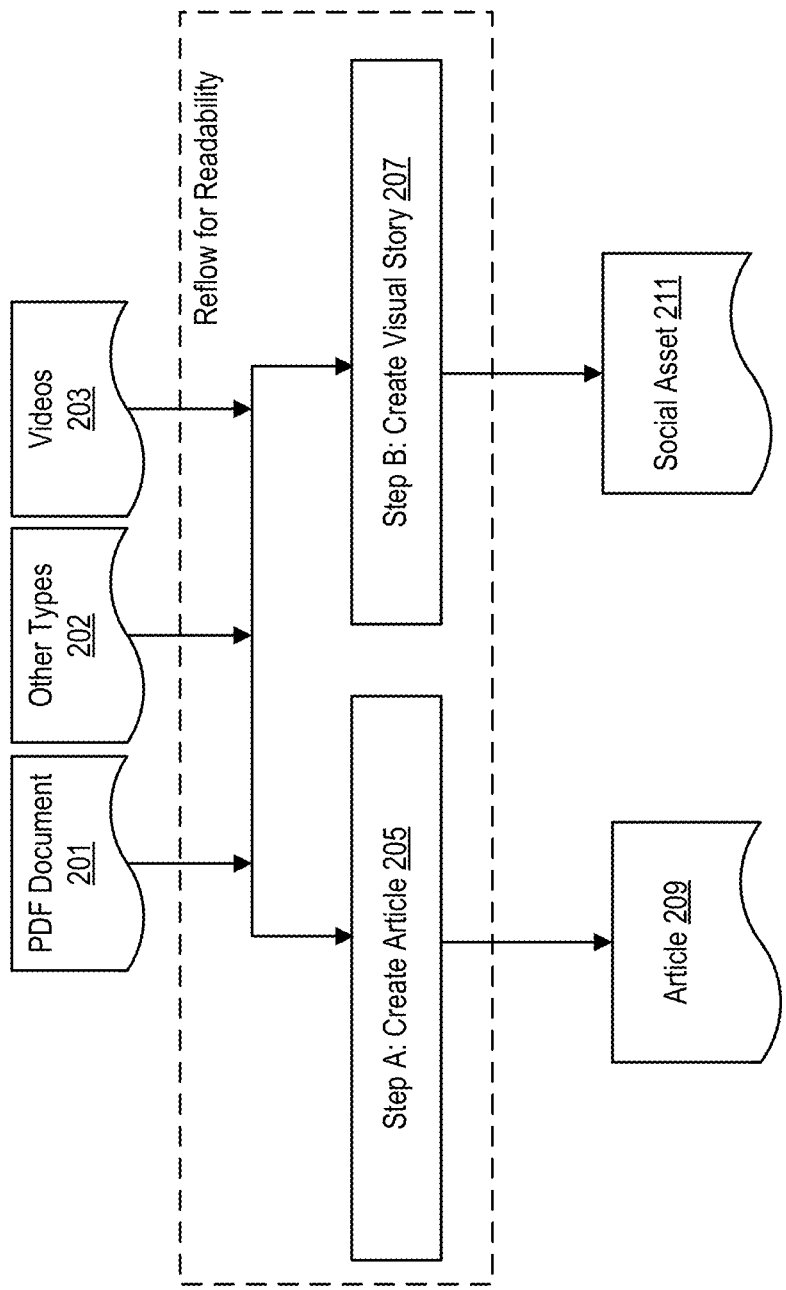
FIG. 2A is a flowchart presenting high-level process steps in a first embodiment.
Figure 2B:
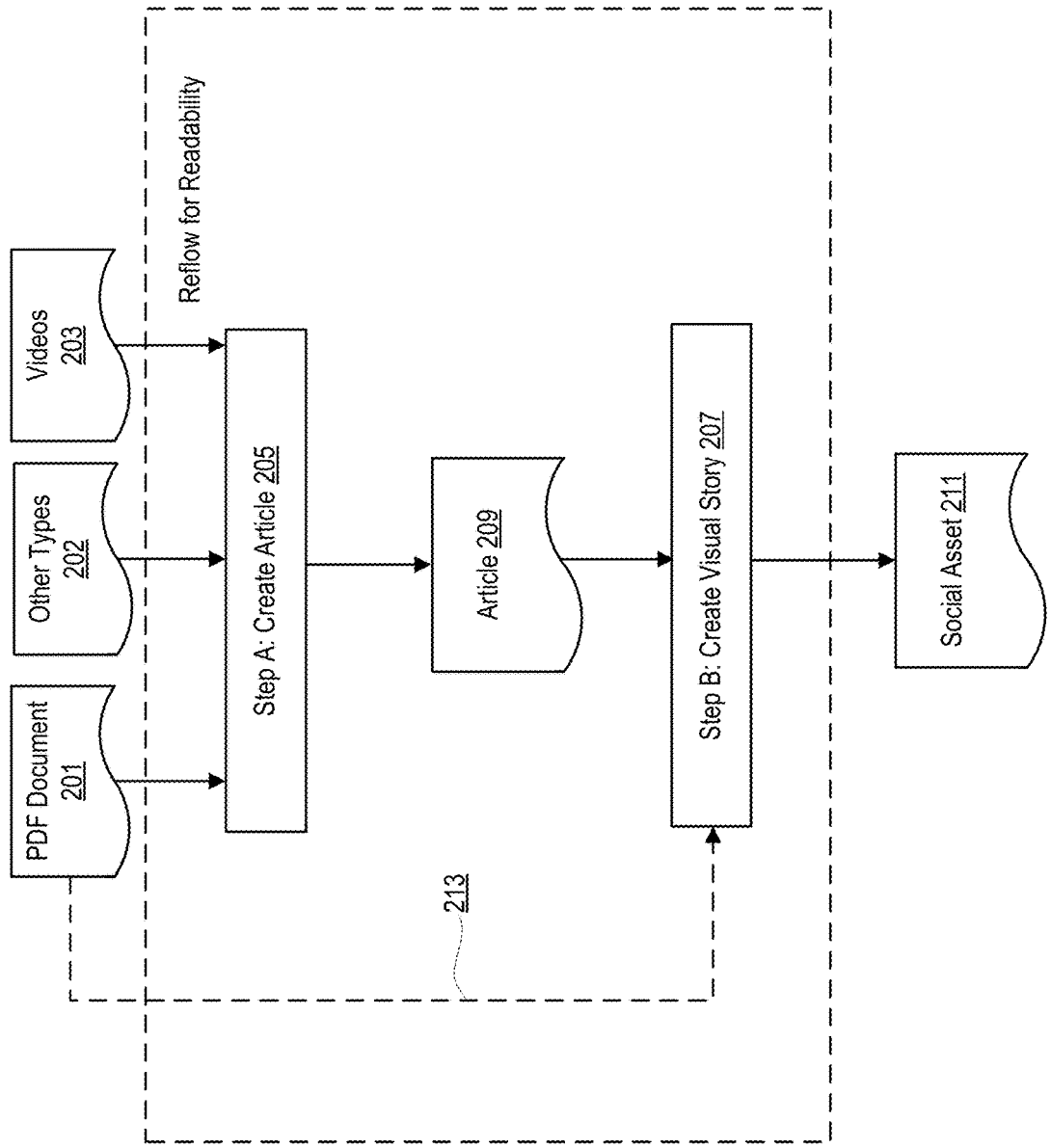
FIG. 2B is a flowchart presenting high-level process steps in a second embodiment.

We now describe two embodiments of the technology disclosed. FIGS. 2A and 2B are flowcharts providing an overview of examples of sequences with which the system of FIG. 1 can be operated. FIG. 2A presents a first embodiment in which the content is provided as input in the form of an electronic publication in PDF file (201), in other types of formats (202) such as Microsoft Word™ document or PowerPoint™ presentations, and as videos (203). The process to create an article 209 or a social asset 211 is referred to as reflow for readability. There are two high level process steps in this process: create article (step A) 205 and create visual story (step B) 207. In the first embodiment as shown in FIG. 2A, the two process steps (steps A and B) are carried out in parallel. Both process steps can take the same inputs as described above. The output from process step A is the article 209 and output from process step B is the social asset 211.

FIG. 2B presents a second embodiment in which the two process steps (step A and step B) are carried out serially, i.e., one after the other. The article 209 which is output of the create article process step 205 (step A) is given as input to the create visual story process step 207 (step B). FIG. 2B indicates that the electronic publication PDF document 201 can be given as an input to step B. This input is indicated by a broken line 213 to show that this is an optional input to step B. For example, in one embodiment both the PDF document 201 and the article 209 can be given as inputs to create the visual story process step 207 (step B). In another embodiment, only the article 209 is given as input to step B to produce the social asset 211. We now describe the two process steps (step A and step B) in more detail in the following sections.

Process Flow for Creating an Article

Figure 3:
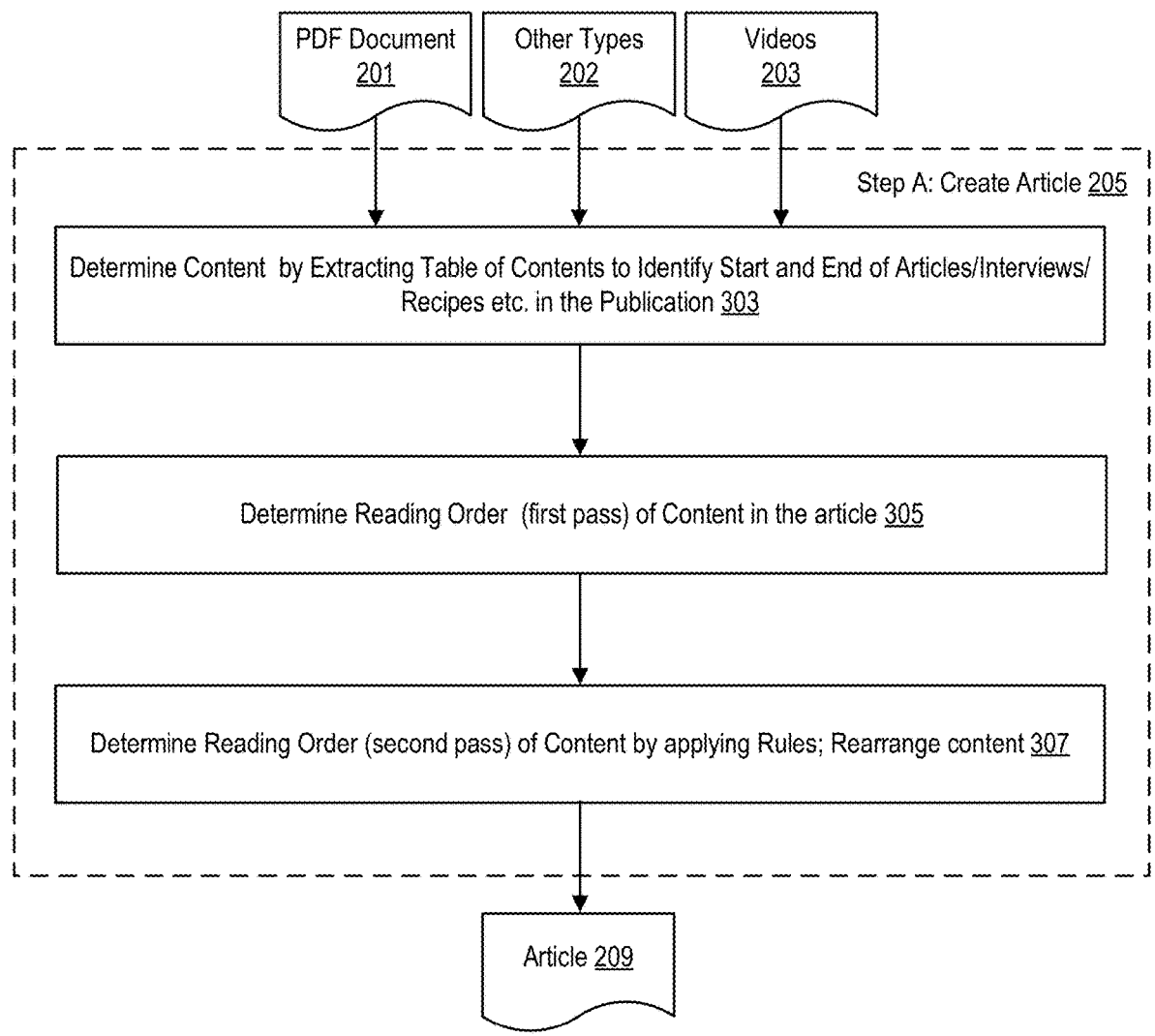
FIG. 3 is a flowchart presenting detailed process steps for creating an article.

FIG. 3 presents a flowchart with detailed process steps for the 'create article' process step 205 (step A). The inputs to the process include the electronic publication as a PDF document 201, other types of documents 202, and videos 203. The technology disclosed processes the content in the PDF document 201 in a series of steps to identify content on pages of the PDF document and determine a reading order. As described above, the content can include text, images and videos etc. At step 303, the technology disclosed decomposes the PDF document into its components such as text, fonts (including font file), colors, formatting (such as spacing, paragraphs, kerning), links (such as Uniform Resource Locators or URLs), and images (including image layers). If a table of content is included in the PDF document 201, the system extracts the table of content and parses it to determine the start and end locations of the articles in the publication. The system can also inspect other meta data of the PDF document 201 to determine the start and end locations of the articles in the electronic publication. The system can use this information to select the pages from the publication that comprise an article in the electronic publication.

In another embodiment, if the table of content is not available in the electronic publication or the document meta data cannot be used to determine the start and end locations of the articles in the electronic publication, the system can present the electronic publication in a flat plan page selection utility to the user to select the pages that comprise an article in the publication. The user can select pages in the publication in a sequential or a random order to identify the pages of the article in the publication that are to be converted to article 209 in target format.

The technology disclosed determines reading order of the content of the article in two passes. The reading order is the order in which content (such as text passages, images, and videos, etc.) will appear in a vertical scrollable target format of the article 209. At a step 305, a first pass of the content of the article in the electronic publication is performed to determine the reading order of the content. A third party tool such as TET (available at https://www.pdflib.com/products/tet/) can be used to determine the reading order of the content in the first pass. The third party tool provides a suggested order of the content (such text passages, and images). The output from the first pass can have errors and is therefore, further processed in a second pass to determine the final reading order. The order of content output from the third party tool is provided as input to the process step 307. The technology disclosed can apply rules (such as heuristics) related to punctuations, whitespaces, hyphens, first letter capitalization, headlines, bylines, and incomplete sentences to further improve the results of the first pass. For example, the technology disclosed can fix issues like the first letter of the first word in a sentence not a capitalized letter. The technology disclosed can also determine relationships between the text based on the size and/or type of the font. A headline, for example appears at a separate level as opposed to a byline or text passages (such as paragraphs). The ordering of the content can be rearranged in the second pass after application of the heuristics.

Finally, the output of process step 307 is the article in a target format. In one embodiment, the article is in a target format that can be published on Google™ News, Apple™ News, World Wide Web, or specific publishing apps for mobile computing devices, etc. An example of a target format is Google™ Accelerated Mobile Pages (AMP) available at https://amp.dev. The articles in AMP format are easy to read on mobile computing devices as well as on desktop computers.

Process Flow for Creating a Social Asset

Figure 4:
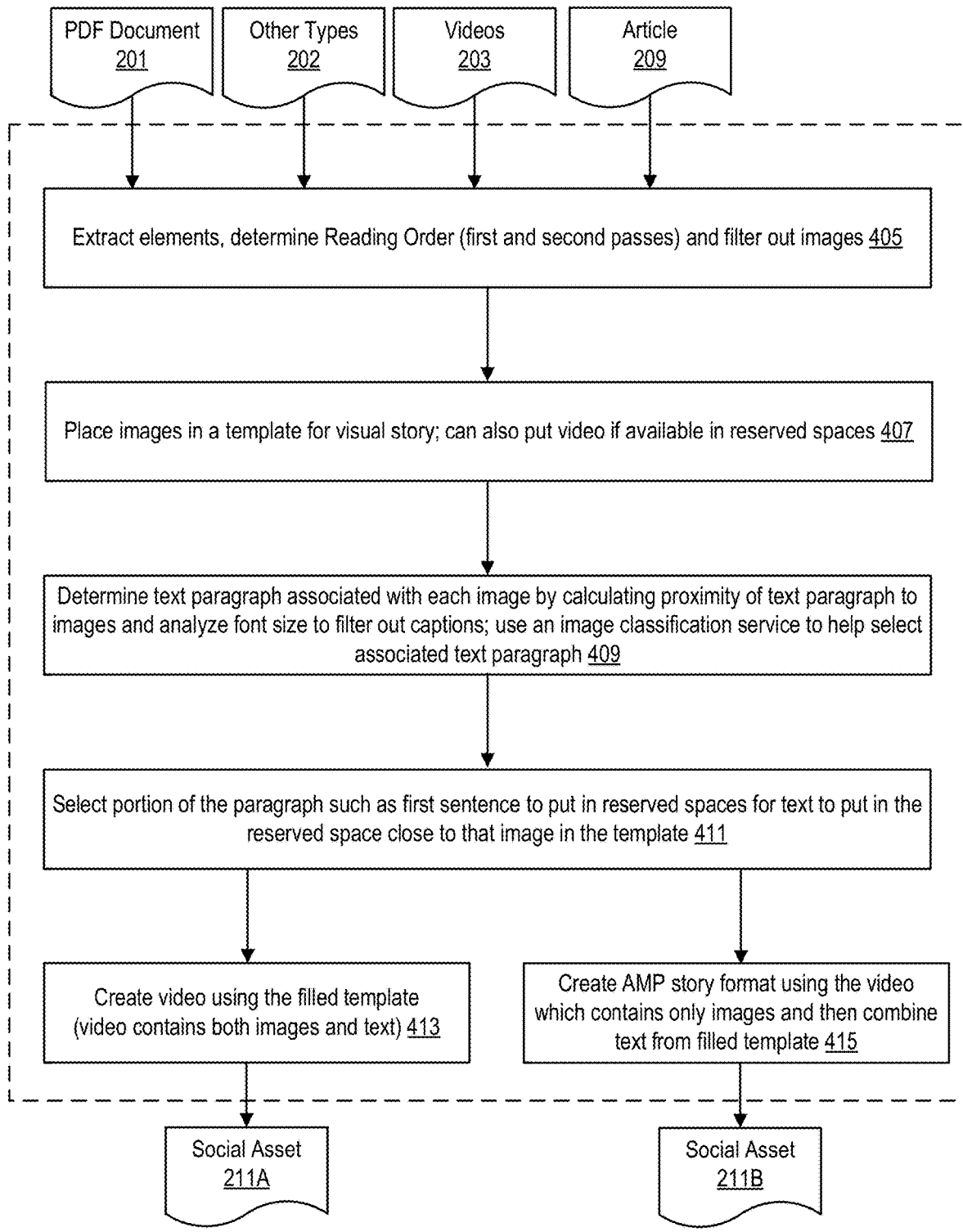
FIG. 4 is a flowchart presenting detailed process steps for creating a social asset.

We now describe detailed process steps for the 'create social story' process step (step B). FIG. 4 presents a flowchart for this process. The inputs to the process can include the electronic publication as PDF document 201, other types of documents 202 or videos 203. As described above in reference to FIG. 2B, the create social story process can optionally take the article 209 as input. The social asset which is also referred to as a visual story or a social story, can be published on a social media platform such as Snapchat™, Instagram™, etc. It is in a video format (such as MPEG) and is intended to present the article in the electronic publication in a story format by using selected images, videos and portions of the text passages from the source article in the electronic publication. At a step 405, the system extracts the elements from the PDF document 201 as described above in process step 303 in the flowchart in FIG. 3. Following this, the reading order of the content of the article is determined using two passes as described in steps 305 and 307 in the flowchart in FIG. 3. Finally, the technology disclosed can also filter out images from the source article using predefined criteria. For example, images that have resolution above a pre-defined threshold can be excluded as these images can be difficult to process on some mobile devices with limited computing resources.

In a next process step (407), a template for the social asset is selected. The templates are stored in the templates database 137 which can be accessed by the social asset generator to select a template. The template has pages designed to be viewed on mobile devices. A page in a template can have reserve spaces or cells to place different types of content. For example, a page can have two reserve spaces for images and one reserve space for text. In one embodiment, a template can be automatically selected using a pre-defined criteria or some pre-selected user preferences. In another embodiment, the system provides a user interface to a user to select a template for creating a social asset. The system then selects images from the source article and places the images in reserve spaces for the images in the template. The system can select as many number of images from the article as the number of reserve spaces for images on the pages of the template. For example, if the article has seven images and the template has reserve spaces for four images. The system selects first four images from the article and places them in respective reserve spaces in the template. The system can also place one or more videos 203 in the template if there are reserve spaces for videos in the template. The system can present the template filled with selected images to a user, allowing the user to replace one or more selected images with other images in the source article that have not been selected by the system for assignment to reserve spaces.

In a next process step 409, the system selects text paragraphs from which portions of text will be placed in reserve spaces for text in the template. The system chooses a first text passage in the source article for associating with the first image in the template. Similarly, the system chooses a second text passage in the source article for associating with the second image in the template and so on. The system uses text from text passages associated with the image to superimpose on the images which is described in the following steps in this flowchart. In one embodiment, the system does not determine association between text and images when choosing the text passages. The system processes the text passages from the start of the article in the publication to select portions of text passages for placing in the reserve spaces for text in the template. For example, the first paragraph is used to select portion of text for placing in the first reserve space for text in the template, the second paragraph is used to select portion of text for placing in the second reserve space for text in the template and so on.

In another embodiment, the system determines the association between text passages and images when choosing text passage for associating with the images. The system can apply various techniques to determine the text passage that is associated with an image in the article. For example, the text passage that is near to an image is likely to be associated with the image. The system calculates the distance between bounding boxes of text passages and bounding boxes of images to determine the text passage nearest to an image. The system can calculate distance between nearest edges of the bounding boxes of text passages and bounding boxes of images to determine the proximity. Other distance calculation techniques can also be used to determine proximity.

The system can also use third party "image categorization service" to determine a category of the image. For example, Amazon Rekognition™ Image API can assign labels to images. The labels can be organized in categories such as objects (e.g., flower, tree, or table etc.), events (e.g., wedding, graduation, or birthday etc.), or concepts (e.g., landscape, evening, or nature etc.). Further details of the Amazon Rekognition™ API are presented at https://docs.aws.amazon.com/rekognition/ which is incorporated herein by reference. The system can then search for keywords describing the category of the image in the text passages and select a text passage having keywords matching the category of the image. The text passage thus identified is then associated with the image. Thus, a portion of text selected from this text passage is then superimposed on the image when the social asset is generated as described below in the process steps of this flowchart. The system uses the association of the text passages with images in the template determined above to superimpose the selected portion of text from text passage on the image associated with the text passage.

Before selecting portions of text from text passages for placing in the reserve spaces for text in the template, the system identifies and removes captions from the text passages. At this point, the content on pages in the article has metadata associated with it which identifies content type and bounding box. To identify the captions, the system processes each image content type. For each image content type, the system processes the text content type and selects the text closest to the image on the vertical axis. The system tests the text against a set of criteria such as whether or not the font size is smaller than the majority of the text on the page and whether or not the number of words in this text block is smaller than the majority of the text blocks on the page. If these two conditions are true, then the system has detected an image caption. The caption is excluded from the text passage for further processing.

In a next process step 411, a portion of the text from the text passage is selected to fit into the reserve space for text on the template. Templates have reserve spaces or cells for different content type, i.e., image, text, video etc. A text cell has a volume defined by its bounding box. The text content in the article has a font and a font size. The system processes the text content to fit into the template text cell by calculating a volume for that text by defining a bounding box using the font size but limited to the volume that can fit the template text cell. The system further processes the text that has been selected from the passage into the bounding box to fit into the reserve space or the cell in the template. This processing is to make sure that the text includes complete sentences and does not break off sentences in the middle. The system parses the selected text from the end of the selected text to identify a period indicating end of a sentence. If a period is found, the bounding box for the selected text is recalculated to match the location of the period and the text after the period is removed from the bounding box. If a period is not found, then the system searches for a white space in the text, starting from the end of the text in the bounding box. The bounding box is recalculated based on the first white space found from the end of the text. The text after the white space is excluded. Finally, the text within the bounding box is placed in the template cell for text. In another embodiment, the system enables the user to edit the text selected in the reserve space for text by providing a user interface. In other embodiments, the system can use other types of characters in the selected text to determine a portion of the selected text to fit into the bounding box.

At this point, the reserve spaces or cells in the template are filled by respective content type from the article in the electronic publication. The system then uses a video generation utility such as OpenShot (available at www.openshot.org) to generate video by combining the selected content (text, images, video) from the article in the template (step 413). The output video file can be in MPEG format or any other video format and is shown as social asset 211A in the flowchart of FIG. 4. The social asset 211A can be uploaded to a social media platform such as Snapchat™, Instagram™, etc. The social asset presents the pages of the template in a video format. In one embodiment, the text in the text cells is superimposed on the images. The video shows the set of reserved spaces on pages of the template move forward in an animated manner. The selected portion of a first text passage superimposes a portion of the first image. When the video is played some of the superimposed text can appear as flowing (or moving) on the images. The portion of the first text passage that is not selected for the reserve space is not included in the template and is not superimposed on the image. Similarly, selected portions of text passages can be superimposed on respective associated images.

The system can also create a social asset 211B in a different format from the social asset 211A that is suitable for viewing on mobile or desktop computing devices. One example format for this purpose is referred to as AMP Story format (available at https://amp.dev). The source content for generating the social asset 211B is the same as the source for the social asset 211A. The source content consists of selected content from the article including images, text and videos placed in reserved spaces or cells in the template. The system uses the software utility at https://amp.dev to generate a social asset in AMP Story format. When played, the social asset 211B video is similar to the social asset 211A video, i.e., it shows images in the template in an animated manner with text superimposed on the images. The superimposed text can also appear as flowing (or moving) on the images when the video is played. However, the AMP Story format stores the text and images separately and allows the system to provide instructions regarding how to flow or move the superimposed text on the images. Therefore, the flow or movement of the text on the images can be customized using the instructions. The system applies the same logic to superimpose the text on images as described above in generation of the social asset 211A.

Example of Creating a Social Asset

Figure 5A:
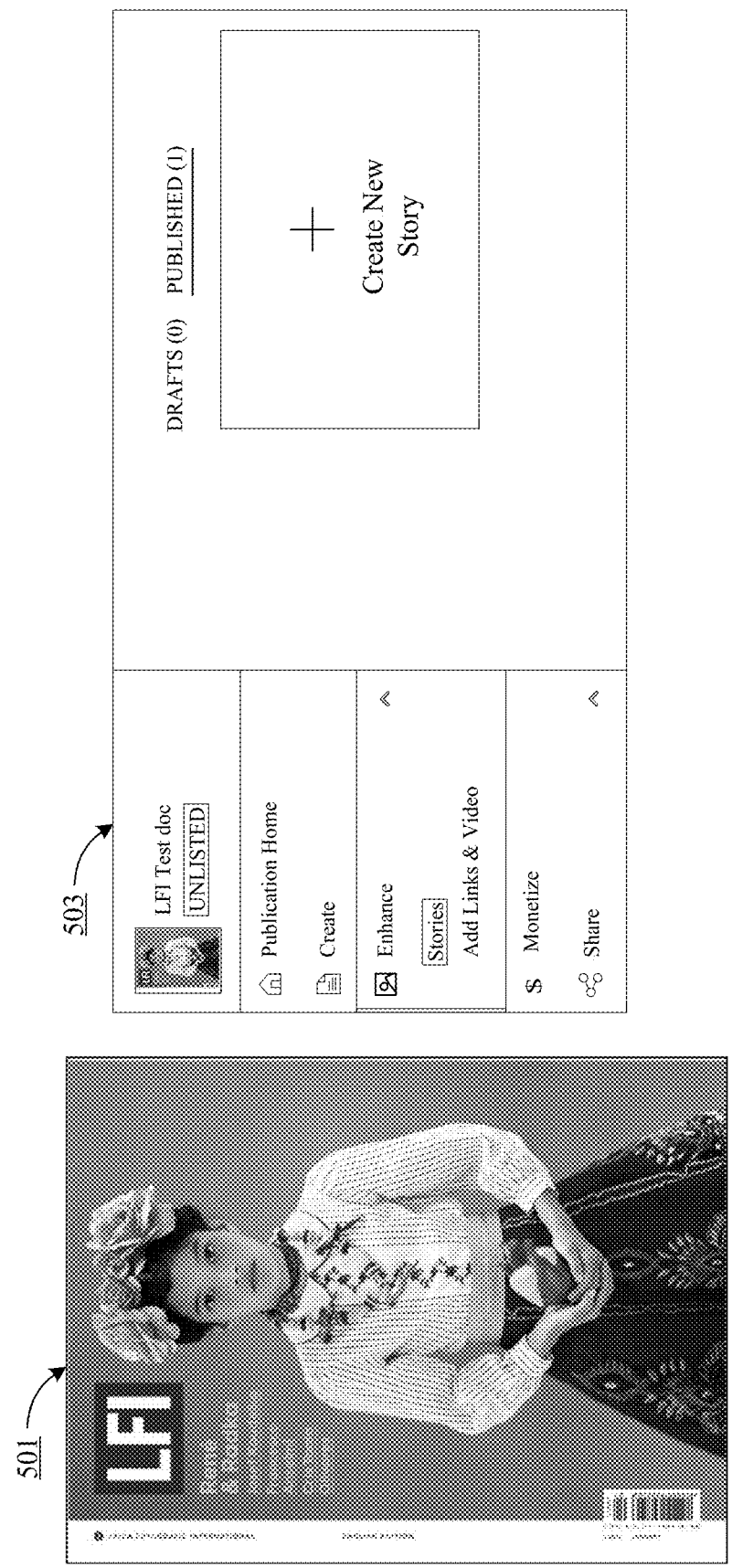
Figure 5B:
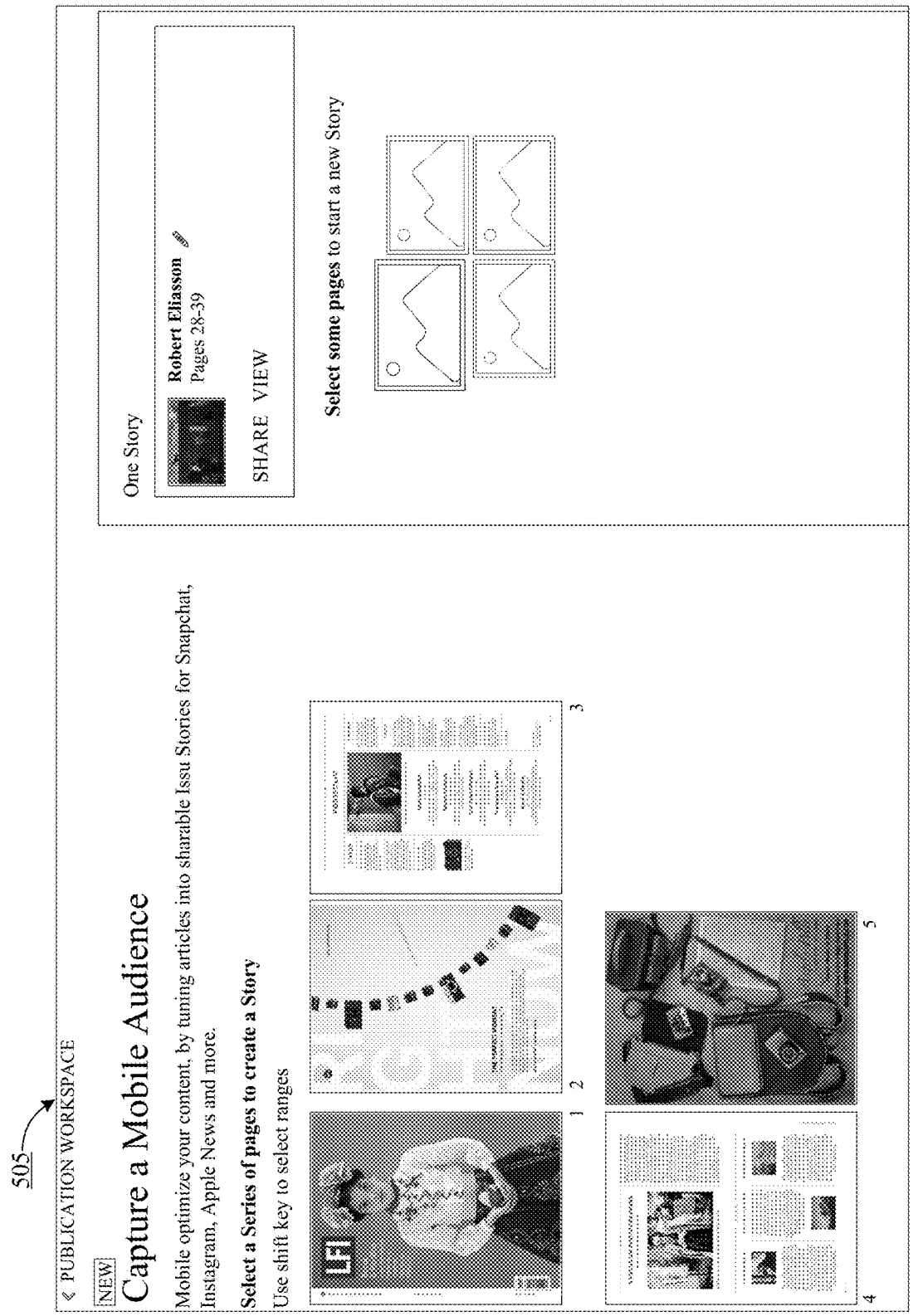
Figure 5C:
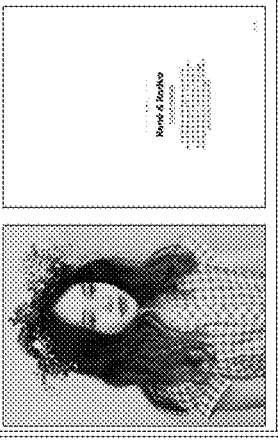
Figure 5D:
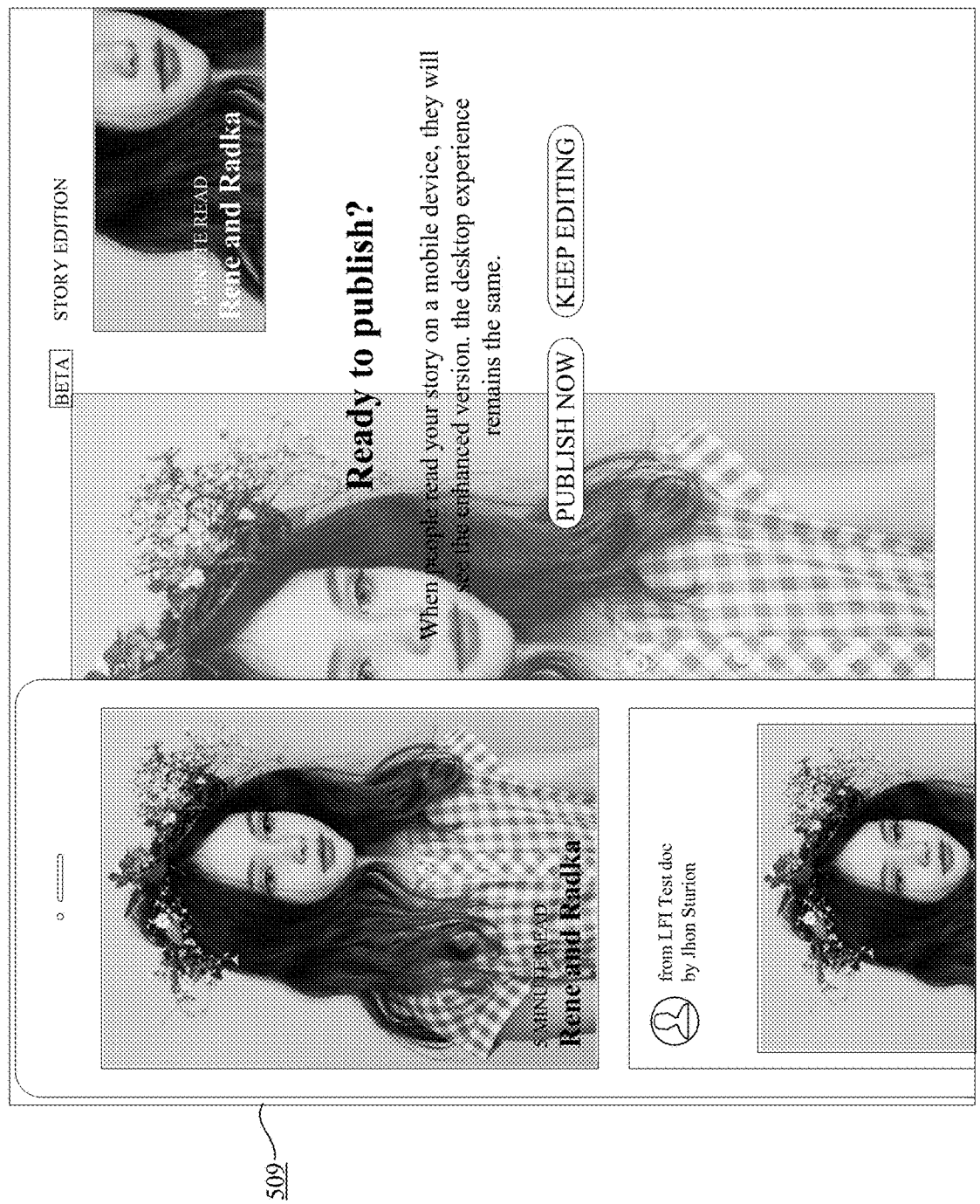

We now present an example to illustrate the process of creating an article and a social asset from an electronic publication. FIG. 5A illustrates a front page of an electronic publication 501. An example user interface 503 to initiate the article creation process is also illustrated in the FIG. 5A. Upon initiation of the article creation process, the user is asked to select pages from the electronic publication. FIG. 5B presents an example user interface 505 enabling a user to select pages to include in the article. As described above, in other embodiments, the technology disclosed can identify pages belonging to articles using a table of contents of the publication or by reading the metadata of the electronic publication document. FIG. 5C presents a user interface 507 displaying the selected pages (on the left portion of the user interface) with check symbols highlighted on the selected pages. The user can also enter other information about the article such as story title, story description, category, etc. The system then generates the article and displays a message 509 shown in FIG. 5D indicating to the user that the article is created. The user can continue to edit the article by pressing the "Keep Editing" button or press the "Publish" button to publish the article on news websites.

Figures 1, 5E:
Figures 2, 5E:
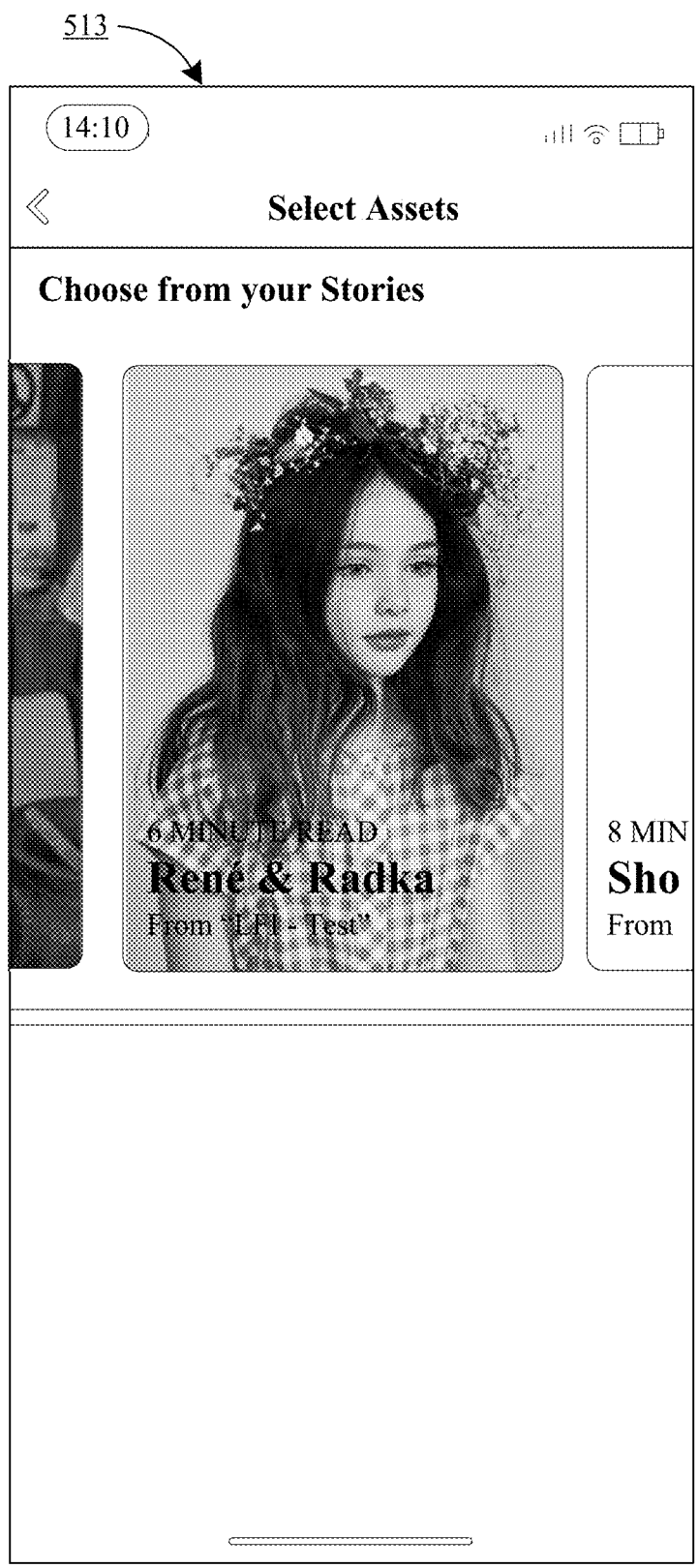
Figures 3, 5E:
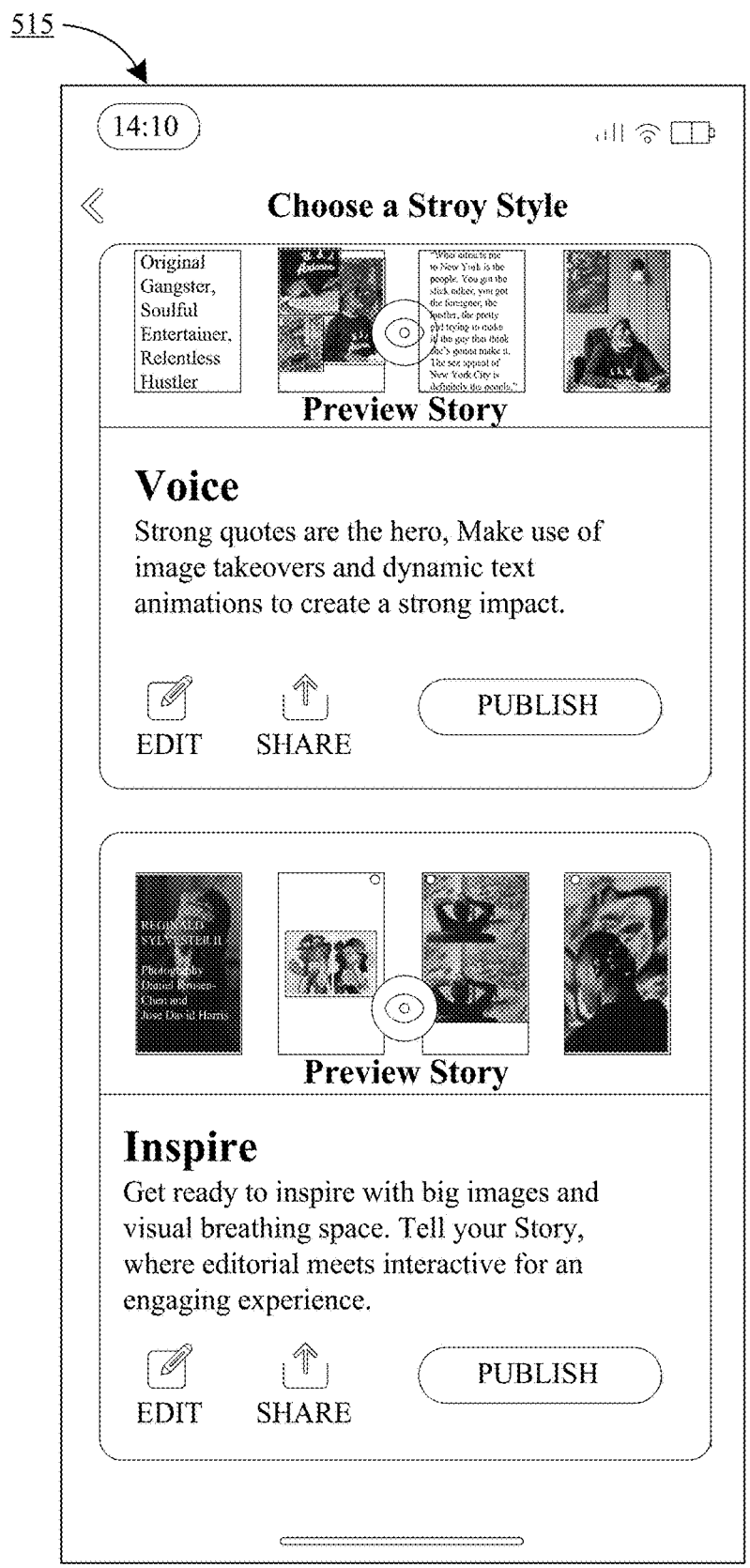
Figures 1, 5F:
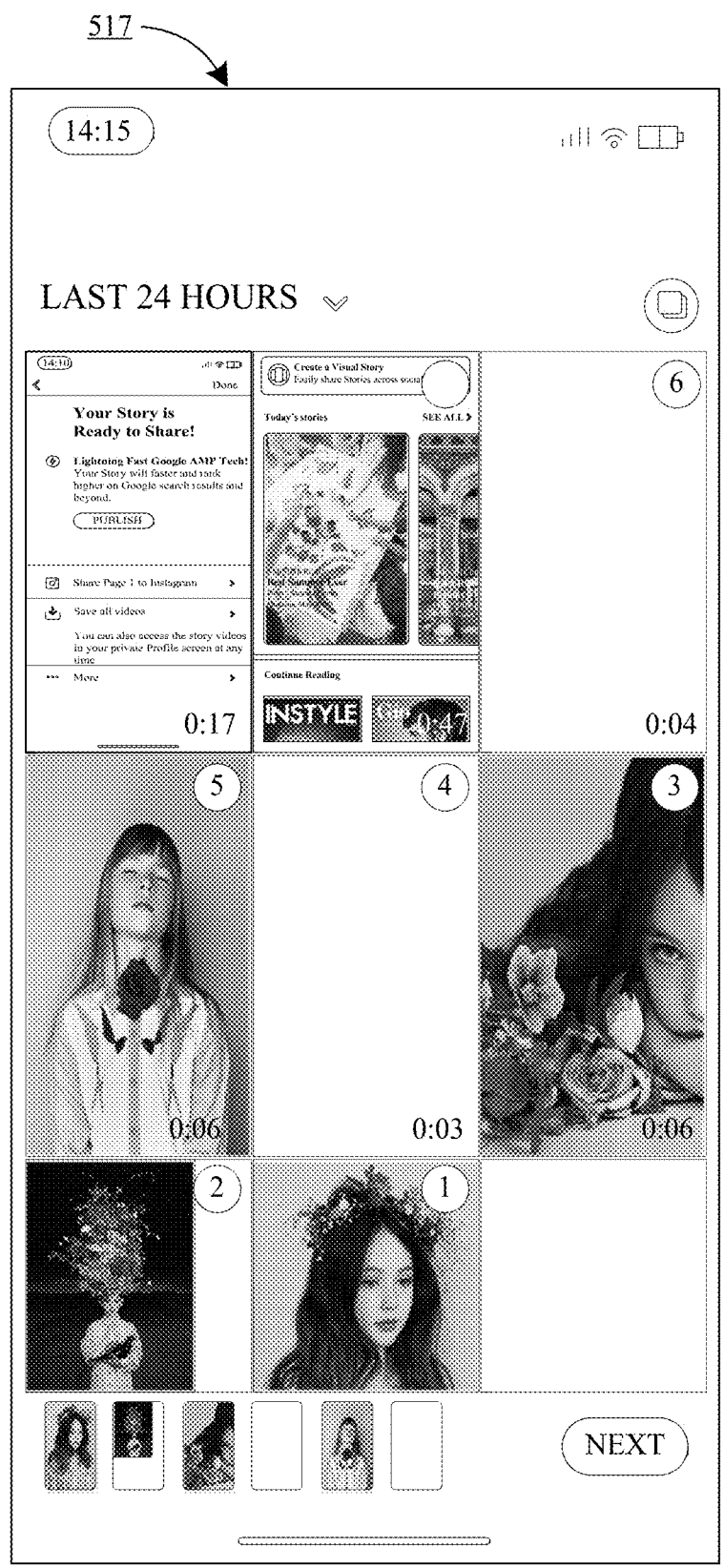
Figures 2, 5F:
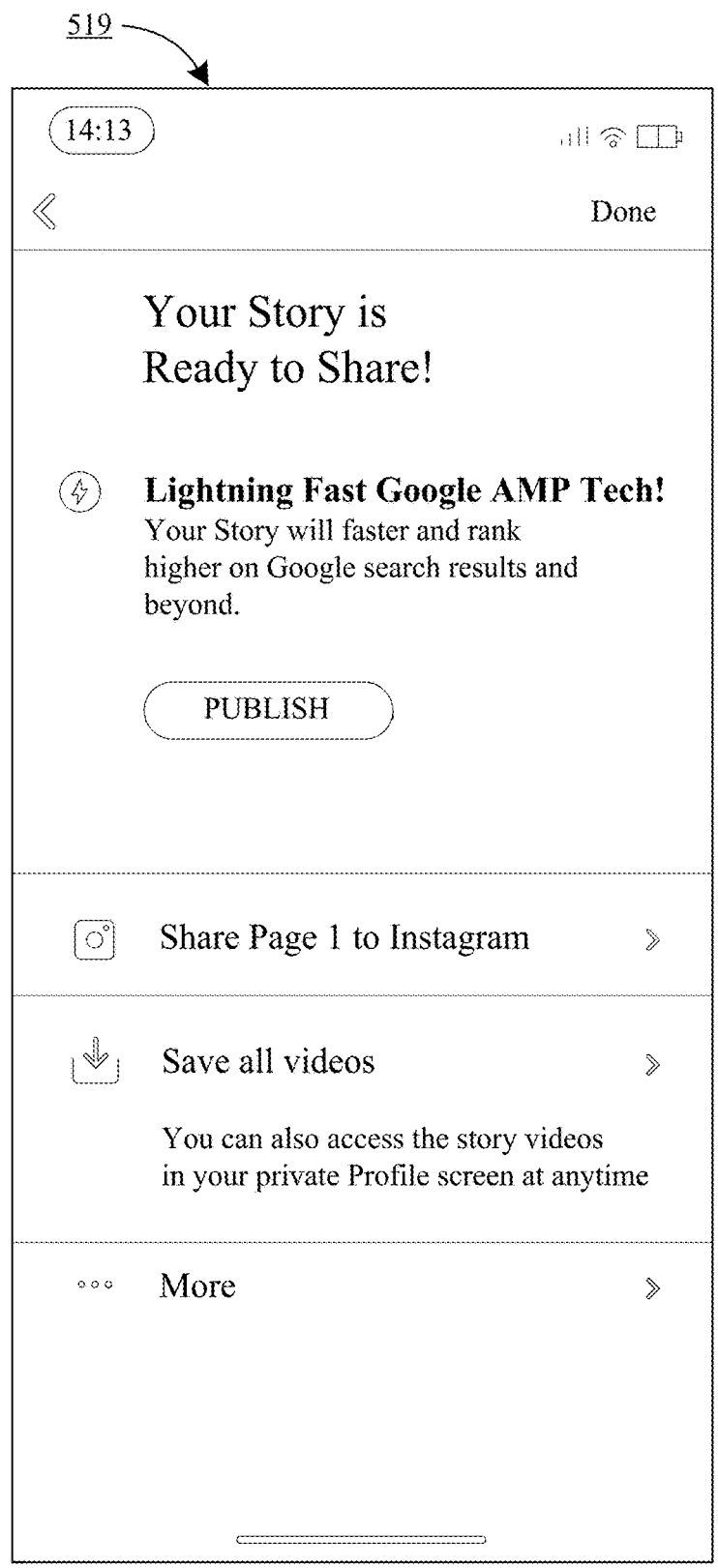
Figures 3, 5F:
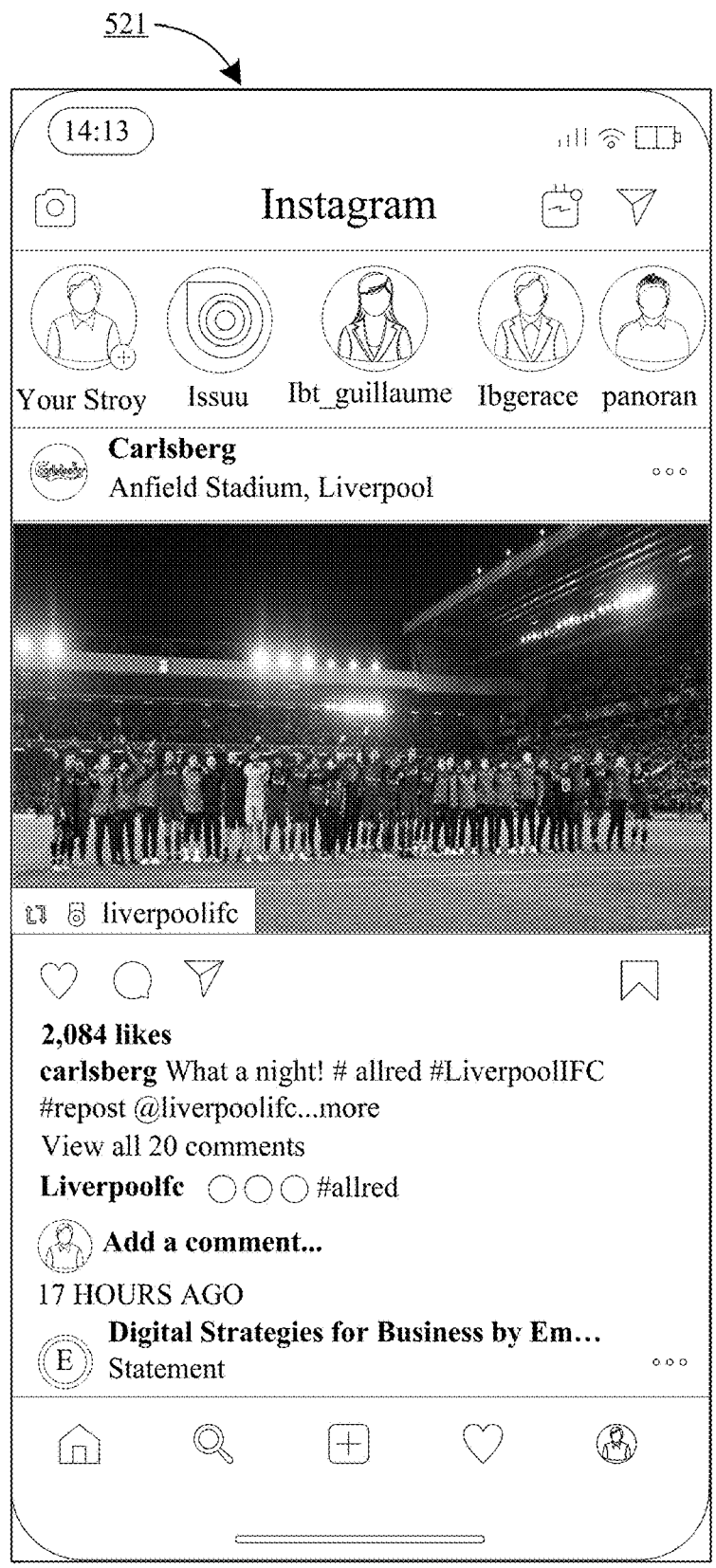

In the next sequence of figures, we illustrate the creation of a social asset or a visual story for publishing on a social media platform. The user can initiate the visual story creation process via a user interface 511 as shown in FIG. 5E-1. Following this, the user is asked to select a story from which the user wants to create the social asset (user interface 513 FIG. 5E2). A user interface 515 FIG. 5E-3 presents multiple story styles to the user to select a style for the social asset. In one embodiment, the templates are defined as part of the story styles. In another embodiment, templates can be defined independently of the story style. FIG. 5F-1 presents a user interface 517 in which the user can identify ordering of the content in the visual story. The user can click the content with a point and click device and the system assigns the sequence numbers in that order as shown in the user interface 517. A user interface 519 FIG. 5F-2 indicates to the user that the social asset is ready for sharing on a social media platform. The user can then select a particular social media platform to upload the social asset as shown in the user interface 521 FIG. 5F-3.

Figures 1, 5G:
Figures 2, 5G:
Figures 1, 5H:
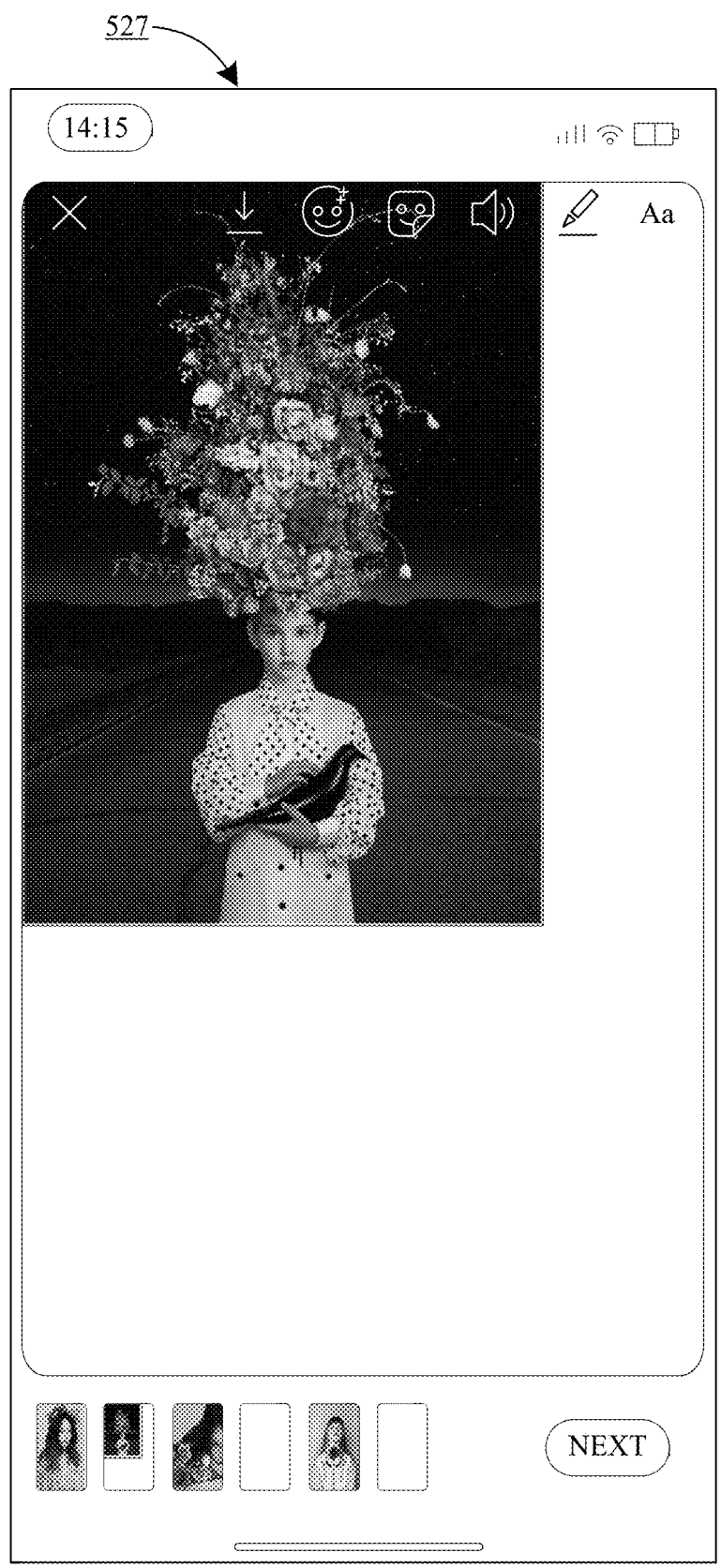
Figures 2, 5H:
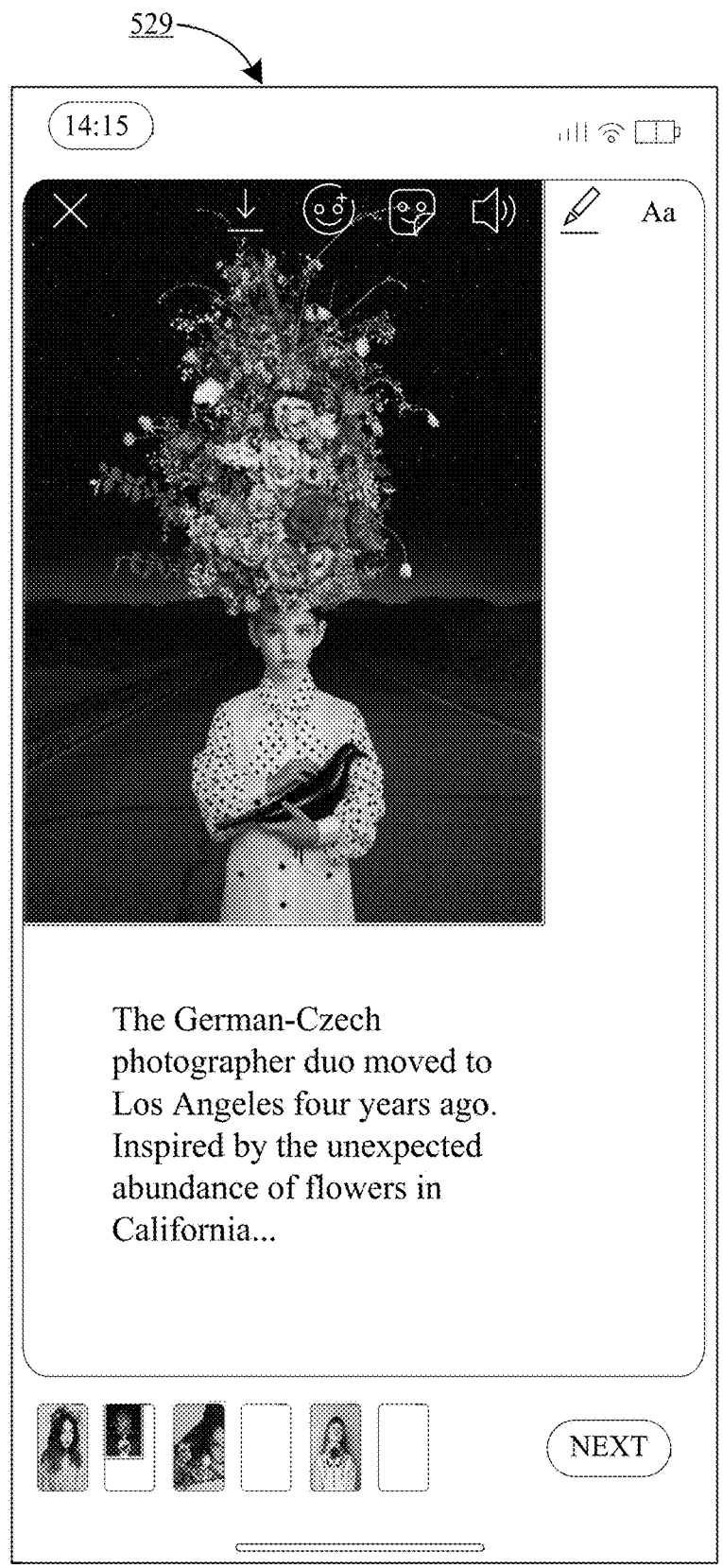
Figure 5I:
Figures 1, 5J:
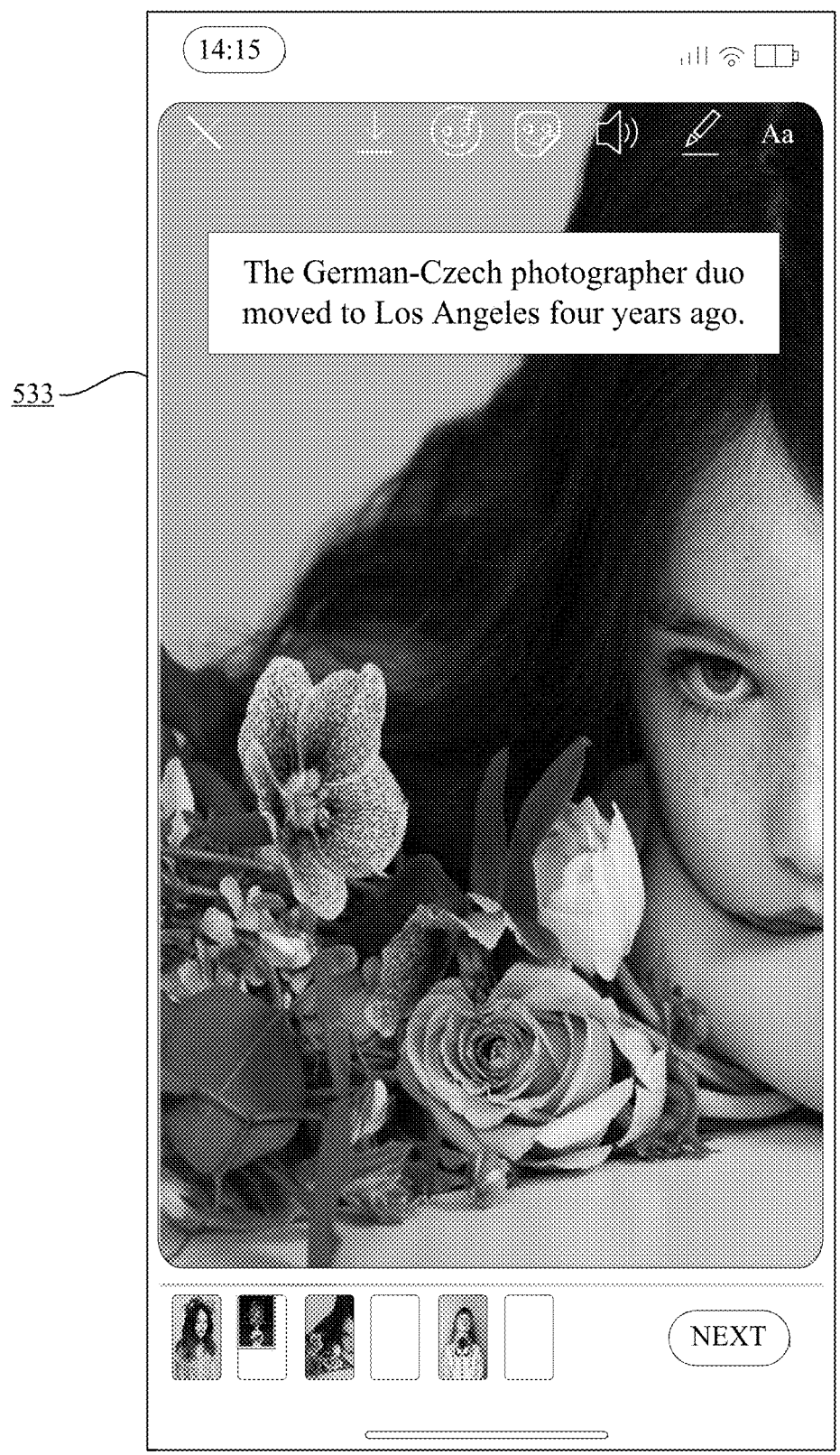
Figures 2, 5J:
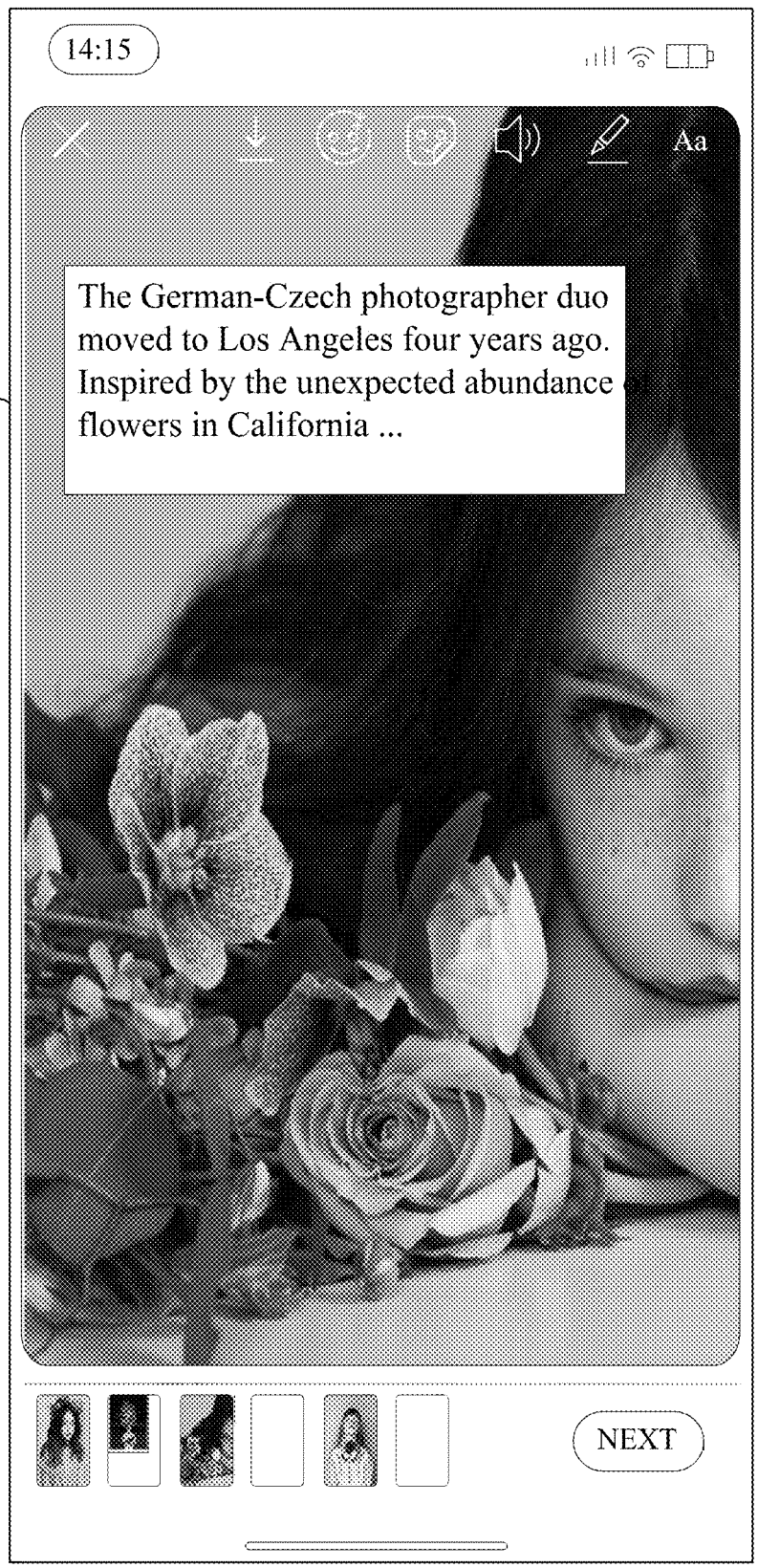
Figures 1, 5K:
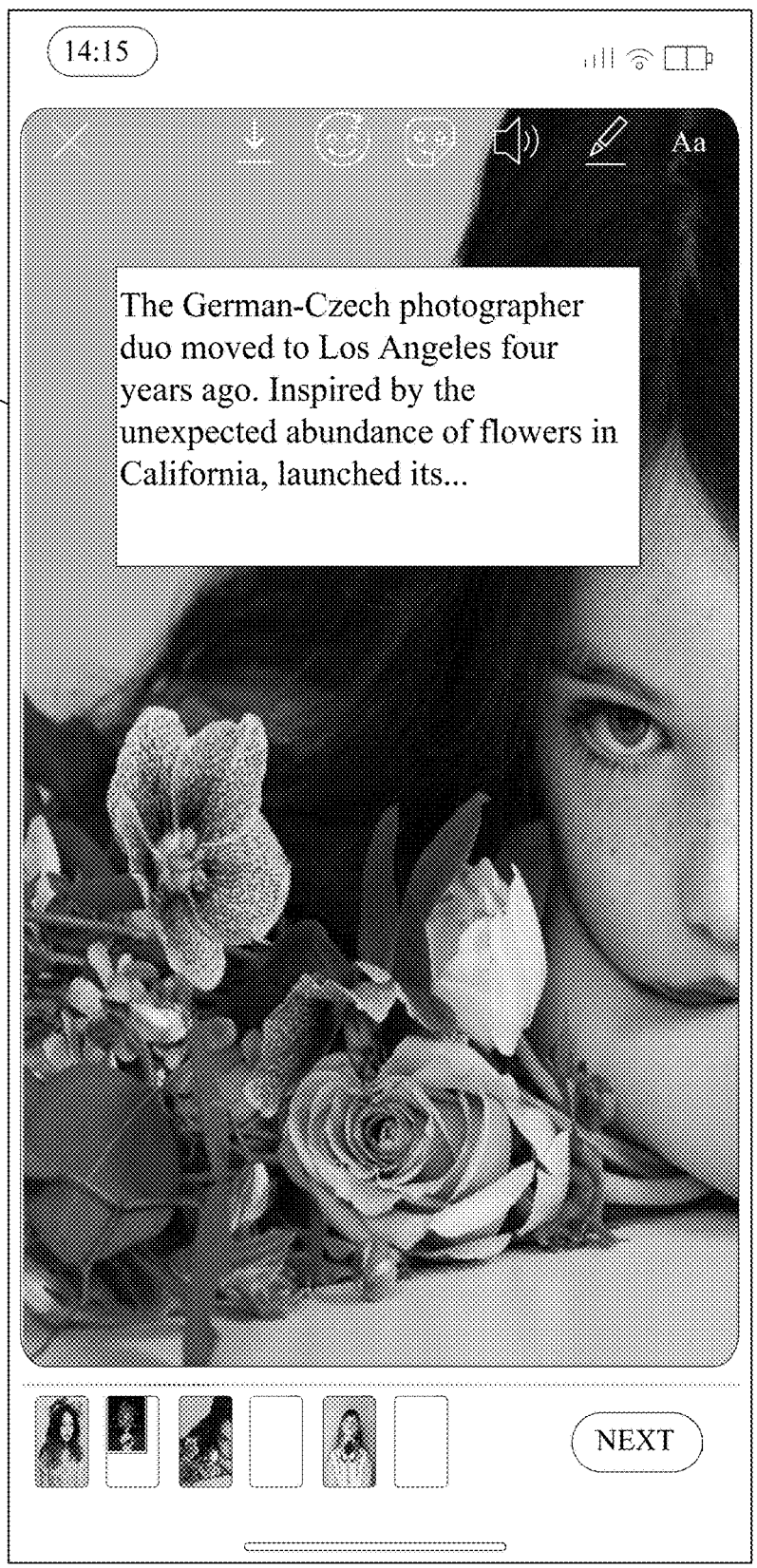
Figures 2, 5K:
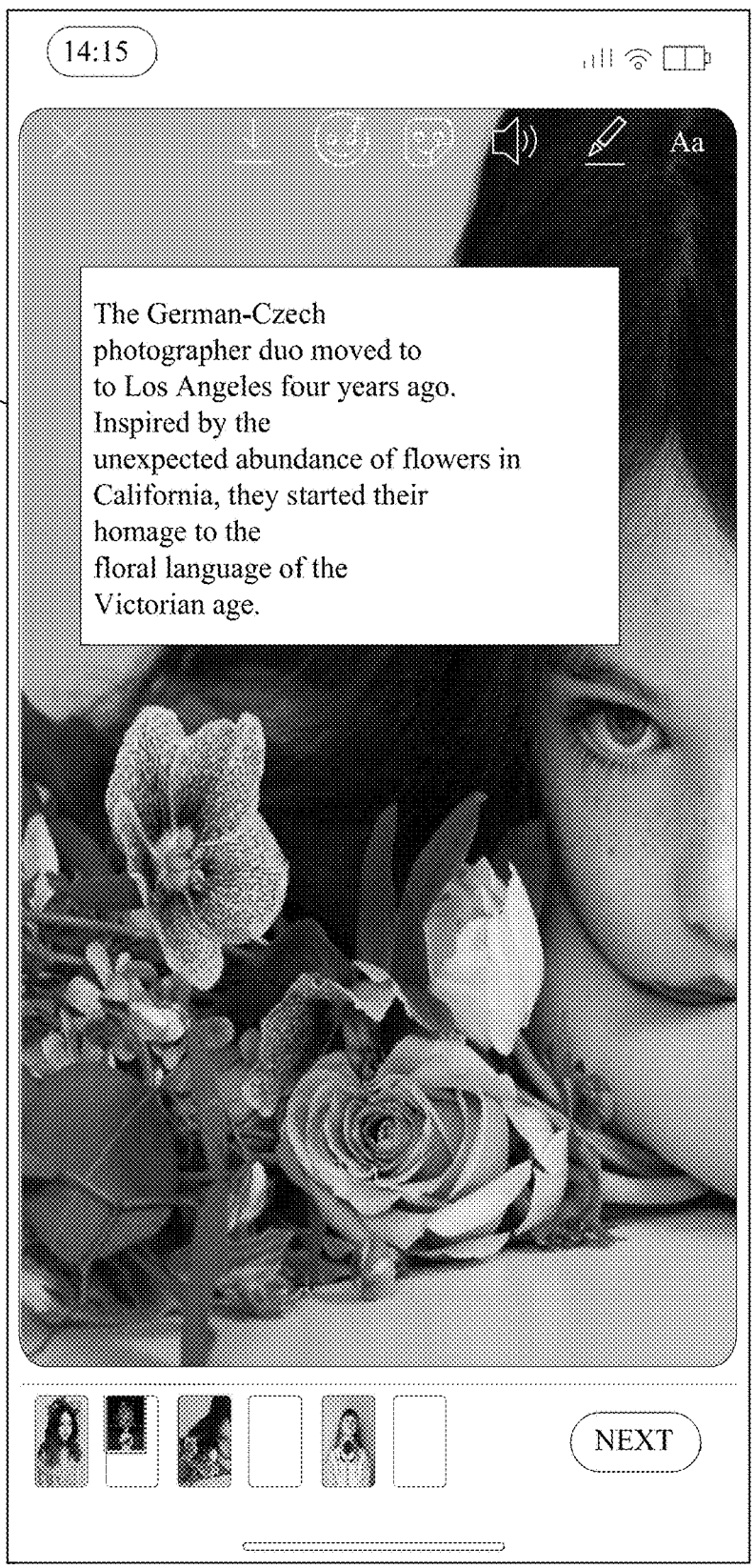

The following figures show selected examples of image frames from the visual story. FIG. 5G-1 and FIG. 5G-2 show two image frames 523 and 525, respectively. The screen capture 523 only includes an image. The image is then superimposed by the text associated with the image as shown in the screen capture 525. Similarly, FIG. 5H-1 illustrates a screen capture 527 containing only an image and a screen capture 529 FIG. 5H-2 containing text in visible association with the image. The text in screen capture 529 is positioned outside the image boundary, however, it visibly associates with the image. FIG. 5I shows a screen capture 531 with an image and no text superimposed on the image. FIGS. 5J-1 and 5J-2 show the same image as in the screen capture 531 but with text associated with the image superimposed on the image (screen capture 533). The superimposed text however, fades in, one line at a time or more than one line at a time on the image. The screen capture 533 shows two lines of text superimposed on the image and a screen capture 535 FIG. 5J-2 shows two more lines of text superimposed on the same image such that it overlaps a portion of the image. The text continues to fade in over the image and as shown in FIG. 5K-1 and FIG. 5K-2 more lines of text become visible and superimposed on the image in screen captures 537 and 539 respectively. The text associated with the image is sometimes referred to herein as dynamic text and can visually appear on the image in a variety of manners. For example, the dynamic text can fade in from left to right or from top to bottom. The dynamic text can move on the image from any direction. The dynamic text can also appear to scroll in on the image. The dynamic text can move on the image and remain stationary after becoming visibly superimposed on the image. In other embodiments, the dynamic text can continue to move and fade out or disappear from the image. It is understood that the text associated with images can appear and can become visibly associated with images in multiple ways.

Computer System

Figure 6:
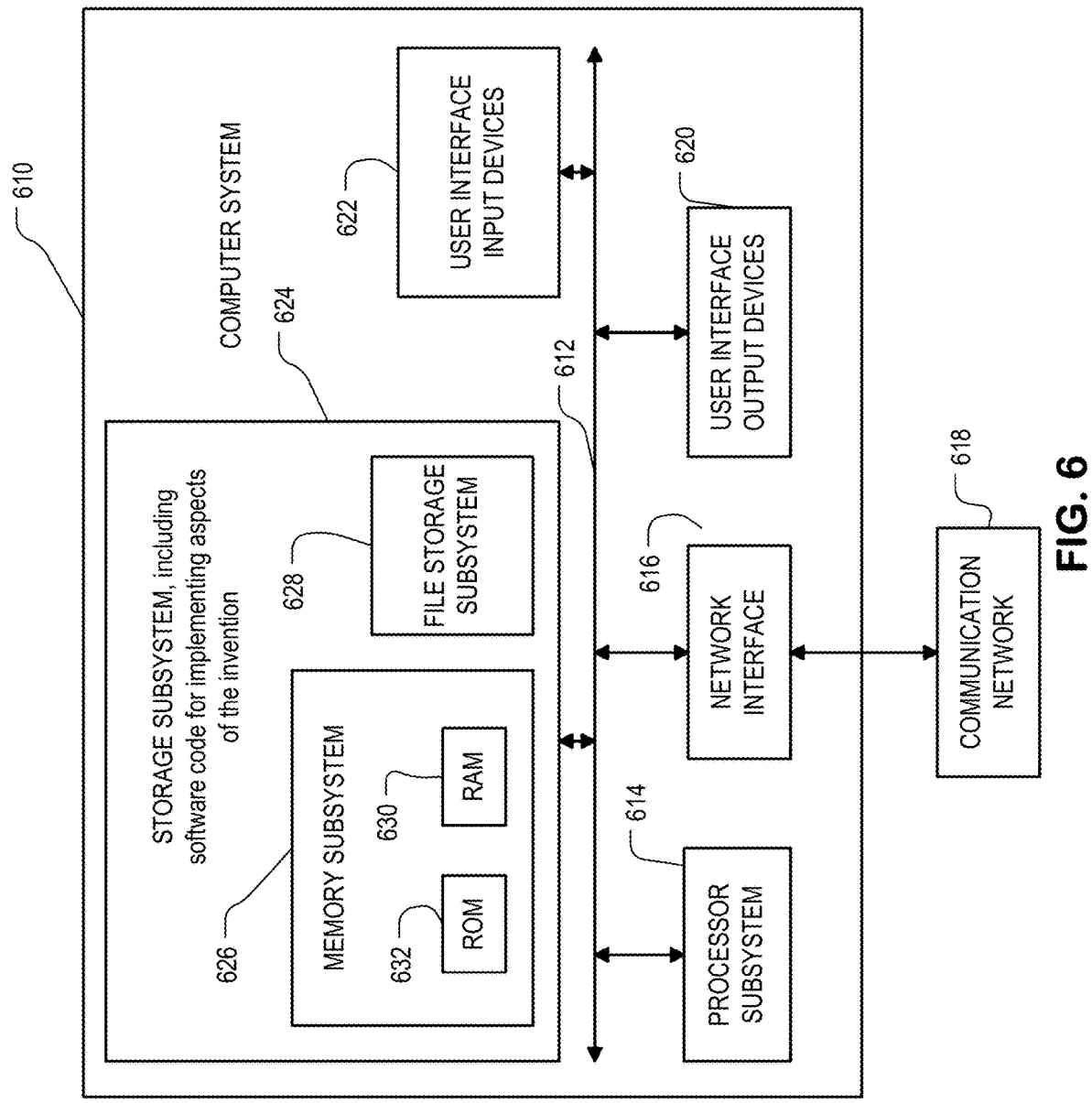
FIG. 6 is a simplified block diagram of a computer system that can be used to implement software incorporating aspects of the present invention.

FIG. 6 is a simplified block diagram of a computer system 610 that can be used to implement the functions performed by the social asset generator 151 and article generator 131 in FIG. 1.

Computer system 610 typically includes a processor subsystem 614 which communicates with a number of peripheral devices via bus subsystem 612. These peripheral devices may include a storage subsystem 624, comprising a memory subsystem 626 and a file storage subsystem 628, user interface input devices 622, user interface output devices 620, and a network interface subsystem 616. The input and output devices allow user interaction with computer system 610. Network interface subsystem 616 provides an interface to outside networks, including an interface to communication network 618, and is coupled via communication network 618 to corresponding interface devices in other computer systems. For example, communication network 618 may be, or be coupled with, communication link 612. Communication network 618 may comprise many interconnected computer systems and communication links. These communication links may be wireline links, optical links, wireless links, or any other mechanisms for communication of information, but typically it is an IP-based communication network. While in one embodiment, communication network 618 is the Internet, in other embodiments, communication network 618 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 622 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 610 or onto computer network 618.

User interface output devices 620 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. The display subsystem may also provide non visual display such as via audio output devices. In general, use of the term "output device" is intended to include all possible types of devices and ways to output information from computer system 610 to the user or to another machine or computer system.

Storage subsystem 624 stores the basic programming and data constructs that provide the functionality of certain embodiments of the present invention. For example, the various modules implementing the functionality of certain embodiments of the invention may be stored in storage subsystem 624. These software modules are generally executed by processor subsystem 614.

Memory subsystem 626 typically includes a number of memories including a main random access memory (RAM) 630 for storage of instructions and data during program execution and a read only memory (ROM) 632 in which fixed instructions are stored. File storage subsystem 628 provides persistent storage for program and data files, and may include a hard disk drive, a floppy disk drive along with associated removable media, a CD ROM drive, an optical drive, or removable media cartridges. When computer system 610 represents the social asset generator 151, the publication database 115 may be stored in the storage subsystem 624, or it may be stored in a separate facility accessible to the social asset generator 151 via communication network 155. The databases and modules implementing the functionality of certain embodiments of the invention may have been provided on a computer readable medium such as one or more CD-ROMs, and may be stored in a non-transitory manner by file storage subsystem 628. The host memory 626 contains, among other things, computer instructions which, when executed by the processor subsystem 614, cause the computer system to operate or perform functions as described herein. As used herein, processes and software that are said to run in or on "the host" or "the computer", execute on the processor subsystem 614 in response to computer instructions and data in the host memory subsystem 626 including any other local or remote storage for such instructions and data.

Bus subsystem 612 provides a mechanism for letting the various components and subsystems of computer system 610 communicate with each other as intended. Although bus subsystem 612 is shown schematically as a single bus, alternative embodiments of the bus subsystem may use multiple busses.

Computer system 610 itself can be of varying types including a personal computer, a portable computer, a workstation, a computer terminal, a network computer, a television, a mainframe, a server farm, or any other data processing system or user device. Due to the ever-changing nature of computers and networks, the description of computer system 610 depicted in FIG. 6 is intended only as a specific example for purposes of illustrating the preferred embodiments of the present invention. Many other configurations of computer system 610 are possible having more or less components than the computer system depicted in FIG. 6.

What is claimed is:

1. A method of selecting portions from an electronic publication including images and a plurality of text passages for generating a social asset, the method including:
    assigning images from the electronic publication to each of a set of reserve spaces for images in a page having a defined number of reserve spaces for images, including assigning a first image from the electronic publication to a first reserve space of the reserve spaces for an image;
    choosing a first text passage of the plurality of text passages for associating with the first image by inferring association in the electronic publication between the first text passage of the plurality of text passages and the first image, including:
        calculating distances of each of the plurality of text passages in the electronic publication to the first image;
        filtering out and removing the text passages in captions of images;
        selecting, as the first text passage, from among remaining text passages not filtered out, a selected text passage with a shortest distance to the first image and inferring the association between the selected text passage and the first image; and
    selecting a portion of the first text passage which is less than all of the first text passage, to provide to a process for generating a social asset.

2. The method of claim 1, wherein the selected portion of the first text passage, and not portions of the first text passage other than the selected portion of the first text passage, superimposes a portion of the first image.

3. The method of claim 1, wherein the set of reserve spaces further includes at least one reserve space for text, the reserve space for text being associated in a template with a second reserve space of the reserve spaces for an image;
    assigning a second image from the electronic publication to the second reserve space for an image;
    choosing a second text passage of the text passages for associating with the second image;
    selecting a portion of the second text passage which is less than all of the second text passage to fit within the second reserve space for text; and
    assigning the portion of the second text passage to the second reserve space for text; and
    wherein the social asset, when moving forward in an animated manner, maintains the second reserve space for text in visible association with the second reserve space for an image.

4. The method of claim 1, wherein the page is from a template that comprises of a plurality of pages.

5. The method of claim 1, wherein generating the social asset by processing the set of reserve spaces to automatically move forward in an animated manner further includes moving forward the social asset, page by page.

6. The method of claim 1, wherein assigning images from the electronic publication to each of the reserve spaces for images further includes assigning images from the electronic publication to reserve spaces in a first pass by inferred reading order.

7. The method of claim 6, wherein assigning images from the electronic publication to each of the reserve spaces for images further includes enabling a user to modify the assignment of images from the electronic publication to reserve spaces in a second pass following the first pass.

8. The method of claim 1, wherein inferring association in the electronic publication between the first text passage of the text passages and the first image further includes:
    using an image classification service to determine keywords representing the first image; and
    selecting as the first text passage a text passage in dependence upon the determined keywords.

9. The method of claim 1, wherein selecting a portion of the first text passage which is less than all of the first text passage further includes selecting a subset of fewer than all sentences of the first text passage.

10. The method of claim 1, wherein selecting a portion of the first text passage which is less than all of the first text passage further includes enabling a user to select a subset of fewer than all sentences of the first text passage.

11. A system including one or more processors coupled to a memory, the memory loaded with computer instructions to select portions from an electronic publication including images and a plurality of text passages in order to generate a social asset, which instructions, when executed on the processors, implement actions comprising:
assigning images from the electronic publication to each of a set of reserve spaces for images in a page having a defined number of reserve spaces for images, including assigning a first image from the electronic publication to a first reserve space of the reserve spaces for an image;
choosing a first text passage of the plurality of text passages for associating with the first image by inferring association in the electronic publication between the first text passage of the plurality of text passages and the first image, including:
calculating distances of each of the plurality of text passages in the electronic publication to the first image;
filtering out and removing the text passages in captions of images;
selecting, as the first text passage, from among remaining text passages not filtered out, a selected text passage with a shortest distance to the first image and inferring the association between the selected text passage and the first image; and
selecting a portion of the first text passage which is less than all of the first text passage, to provide to a process for generating a social asset.

12. The system of claim 11, wherein the selected portion of the first text passage, and not portions of the first text passage other than the selected portion of the first text passage, superimposes a portion of the first image.

13. The system of claim 11, wherein the set of reserve spaces further includes at least one reserve space for text, the reserve space for text being associated in a template with a second reserve space of the reserve spaces for an image, further implementing actions comprising:
assigning a second image from the electronic publication to the second reserve space for an image;
choosing a second text passage of the text passages for associating with the second image;
selecting a portion of the second text passage which is less than all of the second text passage to fit within the second reserve space for text; and
assigning the portion of the second text passage to the second reserve space for text;
wherein the social asset, when moving forward in an animated manner, maintains the second reserve space for text in visible association with the second reserve space for an image.

14. The system of claim 11, wherein the page is from a template that comprises of a plurality of pages.

15. The system of claim 11, wherein generating the social asset by processing the set of reserve spaces to automatically move forward in an animated manner further includes moving forward the social asset, page by page.

16. The system of claim 11, wherein assigning images from the electronic publication to each of the reserve spaces for images further implements actions comprising, assigning images from the electronic publication to reserve spaces in a first pass by inferred reading order.

17. The system of claim 16, wherein assigning images from the electronic publication to each of the reserve spaces for images further implements actions comprising, enabling a user to modify the assignment of images from the electronic publication to reserve spaces in a second pass following the first pass.

18. The system of claim 11, wherein inferring association in the electronic publication between the first text passage of the text passages and the first image further implements actions comprising:
using an image classification service to determine keywords representing the first image; and
selecting as the first text passage a text passage in dependence upon the determined keywords.

19. The system of claim 11, wherein selecting a portion of the first text passage which is less than all of the first text passage further includes selecting a subset of fewer than all sentences of the first text passage.

20. The system of claim 11, wherein selecting a portion of the first text passage which is less than all of the first text passage further includes enabling a user to select a subset of fewer than all sentences of the first text passage.

21. A non-transitory computer readable storage medium impressed with computer program instructions to select portions from an electronic publication including images and a plurality of text passages in order to generate a social asset, which instructions, when executed on a processor, implement a method comprising:
assigning images from the electronic publication to each of a set of reserve spaces for images in a page having a defined number of reserve spaces for images, including assigning a first image from the electronic publication to a first reserve space of the reserve spaces for an image;
choosing a first text passage of the plurality of text passages for associating with the first image by inferring association in the electronic publication between the first text passage of the plurality of text passages and the first image, including:
calculating distances of each of the plurality of text passages in the electronic publication to the first image;
filtering out and removing the text passages in captions of images;
selecting, as the first text passage, from among remaining text passages not filtered out, a selected text passage with a shortest distance to the first image and inferring the association between the selected text passage and the first image; and
selecting a portion of the first text passage which is less than all of the first text passage, to provide to a process for generating a social asset.

* * * * *